(12) United States Patent
Kwak et al.

(10) Patent No.: US 12,418,337 B2
(45) Date of Patent: Sep. 16, 2025

(54) METHODS, APPARATUSES AND SYSTEMS DIRECTED TO BEAM MANAGEMENT IN CONNECTION WITH MULTIPLE CELLS AND/OR MULTIPLE TRANSMISSION/RECEPTION POINTS

(71) Applicant: InterDigital Patent Holdings, Inc., Wilmington, DE (US)

(72) Inventors: Young Woo Kwak, Woodbury, NY (US); Moon Il Lee, Melville, NY (US); Paul Marinier, Brossard (CA); Afshin Haghighat, Ile-Bizard (CA); Virgil Comsa, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 136 days.

(21) Appl. No.: 17/917,492

(22) PCT Filed: Apr. 8, 2021

(86) PCT No.: PCT/US2021/026494
§ 371 (c)(1),
(2) Date: Oct. 6, 2022

(87) PCT Pub. No.: WO2021/207562
PCT Pub. Date: Oct. 14, 2021

(65) Prior Publication Data
US 2023/0144010 A1    May 11, 2023

Related U.S. Application Data

(60) Provisional application No. 63/091,867, filed on Oct. 14, 2020, provisional application No. 63/059,148,
(Continued)

(51) Int. Cl.
*H04W 4/00* (2018.01)
*H04L 5/00* (2006.01)
*H04W 74/0833* (2024.01)

(52) U.S. Cl.
CPC .......... *H04L 5/0051* (2013.01); *H04L 5/0053* (2013.01); *H04W 74/0833* (2013.01)

(58) Field of Classification Search
CPC ... H04L 5/0051; H04L 5/0053; H04L 5/0048; H04W 74/0833; H04W 16/28;
(Continued)

(56) References Cited

U.S. PATENT DOCUMENTS 11,997,665 B2 *   5/2024  Guo ................. H04W 72/046
2018/0302889 A1  10/2018  Guo et al.
(Continued)

FOREIGN PATENT DOCUMENTS

CA    3033533 A1    8/2019
CA    3064313 A1    10/2019
(Continued)

OTHER PUBLICATIONS

AT&T: "On Beam Recovery for Partial and Full Control Channel Failure", 3GPP Draft; R1-1716169 Beam Recovery for Partial and Full Control Channel Failure, 3rd Generation Partnership Project (3GPP), Mobile Competence Centre; 650, Route Des Lucioles; F-06921 Sophia-Antipo, vol. RAN WG1, No. Nagoya, Japan; Sep. 18, 2017-Sep. 21, 2017 Sep. 12, 2017 (Sep. 12, 2017), XP051329792, 7 pages.
(Continued)

*Primary Examiner* — Thai Dinh Hoang
(74) *Attorney, Agent, or Firm* — Majid Albassam

(57) ABSTRACT

Methods, apparatuses, systems, etc. directed to beam management for, and/or for use in connection with, multiple cells and/or multiple transmission/reception points are provided.
(Continued)

Among the methods is a method that may include any of determining first and second reference signals sets (RS sets) associated with first and second sets of beams; receiving information for first and second beam failure recovery (BFR) sets corresponding to the first and second RS sets, wherein the information indicates an RS set associated with candidate beams (CB-RS set) and an uplink resource set for each of the first and second BFR sets; determining beam failures based on the first and second RS sets; selecting the CB-RS set and UL resource set from the first or second BFR set; determining an RS of the selected CB-RS set; and transmitting information indicating the beam failures using uplink resources of the selected uplink resource set.

19 Claims, 15 Drawing Sheets

Related U.S. Application Data filed on Jul. 30, 2020, provisional application No. 63/007,364, filed on Apr. 8, 2020.

(58) Field of Classification Search
CPC ............ H04W 24/04; H04W 72/1268; H04W 72/231; H04W 24/08; H04B 7/024; H04B 7/0695; H04B 1/40; H04B 7/0408; H04B 7/0413

See application file for complete search history.

(56) References Cited

U.S. PATENT DOCUMENTS

| | | | |
|---|---|---|---|
| 2019/0230545 A1 | 7/2019 | Liou et al. | |
| 2019/0268893 A1* | 8/2019 | Tsai | H04B 7/0695 |
| 2019/0306850 A1 | 10/2019 | Zhang et al. | |
| 2019/0306875 A1* | 10/2019 | Zhou | H04W 72/20 |
| 2019/0319833 A1 | 10/2019 | Nagaraja et al. | |
| 2020/0137821 A1* | 4/2020 | Cirik | H04B 7/063 |
| 2020/0314676 A1 | 10/2020 | Lin | |
| 2020/0336928 A1 | 10/2020 | Seo et al. | |
| 2021/0058999 A1 | 2/2021 | Chen et al. | |
| 2021/0105759 A1 | 4/2021 | Bai et al. | |
| 2021/0226688 A1* | 7/2021 | Khoshnevisan | H04L 5/0092 |
| 2022/0103232 A1* | 3/2022 | Zhou | H04W 76/19 |
| 2022/0103233 A1* | 3/2022 | Zhou | H04B 7/088 |
| 2022/0103234 A1* | 3/2022 | Zhou | H04B 7/0695 |
| 2022/0104036 A1 | 3/2022 | Zhou et al. | |
| 2022/0104302 A1 | 3/2022 | Zhou et al. | |
| 2022/0109547 A1 | 4/2022 | Svedman et al. | |
| 2022/0132517 A1 | 4/2022 | Zhu et al. | |
| 2023/0006727 A1 | 1/2023 | Jang et al. | |
| 2023/0028423 A1* | 1/2023 | Xu | H04B 7/06966 |
| 2024/0196463 A1 | 6/2024 | Yuan et al. | |
| 2024/0275467 A1 | 8/2024 | Jang et al. | |

FOREIGN PATENT DOCUMENTS

| | | | |
|---|---|---|---|
| CA | 3145671 A1 | 7/2022 | |
| CN | 110324069 A | 10/2019 | |
| EP | 3547566 A1 | 10/2019 | |
| EP | 3855661 A1 | 7/2021 | |
| KR | 20190130174 A | 11/2019 | |
| KR | 102093901 B1 | 3/2020 | |
| WO | WO 2019031850 A1 | 2/2019 | |
| WO | 2019214636 A1 | 11/2019 | |
| WO | WO 2019214611 A1 | 11/2019 | |
| WO | WO 2020010630 A1 | 1/2020 | |
| WO | WO 2020057665 A1 | 3/2020 | |
| WO | WO 2020102072 A1 | 5/2020 | |
| WO | WO 2021034672 A1 | 2/2021 | |
| WO | WO-2021067444 A2 * | 4/2021 | H04W 24/10 |
| WO | WO 2021168241 A1 | 8/2021 | |
| WO | WO 2021207562 A1 | 10/2021 | |
| WO | 2021259541 A1 | 12/2021 | |
| WO | WO 2021261879 A1 | 12/2021 | |
| WO | 2022072249 A1 | 4/2022 | |
| WO | 2022086778 A1 | 4/2022 | |
| WO | WO 2022072251 A1 | 4/2022 | |
| WO | WO 2022091032 A1 | 5/2022 | |
| WO | 2022155514 A1 | 7/2022 | |
| WO | 2023081258 A1 | 5/2023 | |
| WO | WO-2023205077 A1 * | 10/2023 | H04B 7/063 |

OTHER PUBLICATIONS

3rd Generation Partnership Project; Technical Specification Group Radio Access Network; NR;User Equipment (UE) radio transmission and reception; Part 1: Range 1 Standalone (Release 16); 3GPP TS 38.101-1 V16.2.0 (Dec. 2019); 310 pages.
3rd Generation Partnership Project; Technical Specification Group Radio Access Network; NR; User Equipment (UE) radio transmission and reception; Part 3: Range 1 and Range 2 Interworking operation with other radios (Release 16); 3GPP TS 38.101-3 V16.2.1 (Dec. 2019); 349 pages.
3rd Generation Partnership Project; Technical Specification Group Radio Access Network; NR; Physical layer procedures for control (Release 15), 3GPP TS 38.213 V15.3.0, Sep. 2018, 101 pages.
3rd Generation Partnership Project; Technical Specification Group Radio Access Network; NR;User Equipment (UE) radio transmission and reception; Part 2: Range 2 Standalone (Release 16); 3GPP TS 38.101-2 V16.2.0 (Dec. 2019); 157 pages.
3rd Generation Partnership Project; Technical Specification Group Radio Access Network; NR; Radio Resource Control (RRC) protocol specification (Release 15); 3GPP TS 38.331 V15.4.0 (Dec. 2018); 474 pages.
3rd Generation Partnership Project; Technical Specification Group Radio Access Network; NR; Medium Access Control (MAC) protocol specification (Release 15); 3GPP TS 38.321 V15.1.0, Mar. 2018, 67 pages.
AT&T, "On beam recovery for partial and full control channel failure", 3GPP Tdoc R1-1716169, 3GPP TSG RAN WG1 Meeting NR#3, Nagoya, Japan, Sep. 18-21, 2017, 7 pages.
Giordani, M. et al., "A Tutorial on Beam Management for 3GPP NR at mmWave Frequencies", arXiv:1804.01908v2 [cs.NI] Nov. 4, 2019.
Huawei, Hisilicon, Feature Summary of Enhancements on Multi-TRP/Panel Transmission', 3GPP Tdoc R1-1913299, 3GPP TSG RAN WG1 Meeting #99, Reno, USA, Nov. 18-22, 2019, 88 pages.
3GPP TR 38.913, V16.0.0 (Jul. 2020), "Study on New Radio access technology; Next Generation Access Technologies, (Release 16)", 40 pages.
Qualcomm, "New WID on Extending current NR operation to 71 GHz", 3GPP Tdoc RP-193229, 3GPP TSG RAN Meeting #86, Sitges, Spain, Dec. 9-12, 2019, 5 pages.
Samsung, "Issues for Beam Failure Recovery", 3GPP R2-2002557, 3GPP TSG-RAN2 Meeting #109bis Electronic, Apr. 20-24, 2020, 7 pages.
3rd Generation Partnership Project; Technical Specification Group Radio Access Network; NR; Medium Access Control (MAC) protocol specification (Release 16), 3GPP TS 38.321 V16.0.0, Mar. 2020, 141 pages.
"New SID: Study on supporting NR from 52.6GHz to 71 GHz", 3GPP Tdoc RP-193259, 3GPP TSG RAN Meeting #86, Sitges, Spain, Dec. 9-12, 2019, 18 pages.
Intel Corporation, "New SID: Study on NR beyond 52.6GHz", 3GPP Tdoc RP-181435, 3GPP TSG RAN Meeting #80, La Jolla, USA, Jun. 11-14, 2018, 4 pages.
3rd Generation Partnership Project; Technical Specification Group Radio Access Network; NR; Radio Resource Control (RRC) protocol specification (Release 16), 3GPP TS 38.331 V16.0.0, Mar. 2020, 835 pages.
3rd Generation Partnership Project; Technical Specification Group Radio Access Network; Study on New Radio access technology; 60 GHz unlicensed spectrum (Release 14), 3GPP TR 38.805 V14.0.0 (Mar. 2017), 17 pages.

(56) References Cited

OTHER PUBLICATIONS

3rd Generation Partnership Project; Technical Specification Group Radio Access Network; Study on requirements for NR beyond 52.6 GHz (Release 16); 3GPP TR 38.807 V16.0.0 (Dec. 2019), 68 pages.
Qualcomm Inc., "Discussion on BFR in multi-TRP operation", 3gpp Tdoc R2-1911378, 3GPP TSG-RAN WG2 Meeting #107, Prague, Czech, Aug. 26-30, 2019, 3 pages.
Third Generation Partnership Project, "Technical Specification Group Radio Access Network; NR; Physical layer procedures for control (Release 16)," 3GPP TS 38.213 V16.1.0, Mar. 2020, 156 pages.

* cited by examiner

METHODS, APPARATUSES AND SYSTEMS DIRECTED TO BEAM MANAGEMENT IN CONNECTION WITH MULTIPLE CELLS AND/OR MULTIPLE TRANSMISSION/RECEPTION POINTS

CROSS-REFERENCE TO RELATED APPLICATIONS

This application is a U.S. National Stage Application under 35 U.S.C. § 371 of International Patent Application No. PCT/US2021/026494 filed Apr. 8, 2021, which claims the benefit of U.S. Provisional Patent Application Nos. (i) 63/007,364 filed Apr. 8, 2020, (ii) 63/059,148 filed Jul. 30, 2020 and (iii) 63/091,867 filed Oct. 14, 2020; each of which is incorporated herein by reference.

BACKGROUND

The present disclosure relates to wireless communications, including, but not exclusively, to methods, apparatuses, systems, etc. directed to beam management in connection with multiple cells and/or multiple transmission/reception points.

BRIEF DESCRIPTION OF THE DRAWINGS

A more detailed understanding may be had from the following description, given by way of example in conjunction with the accompanying drawings. Figures in such drawings, like the detailed description, are examples. As such, the Figures and the detailed description are not to be considered limiting, and other equally effective examples are possible and likely. Furthermore, like reference numerals in the figures indicate like elements, and wherein.

DETAILED DESCRIPTION

Figure 1A:
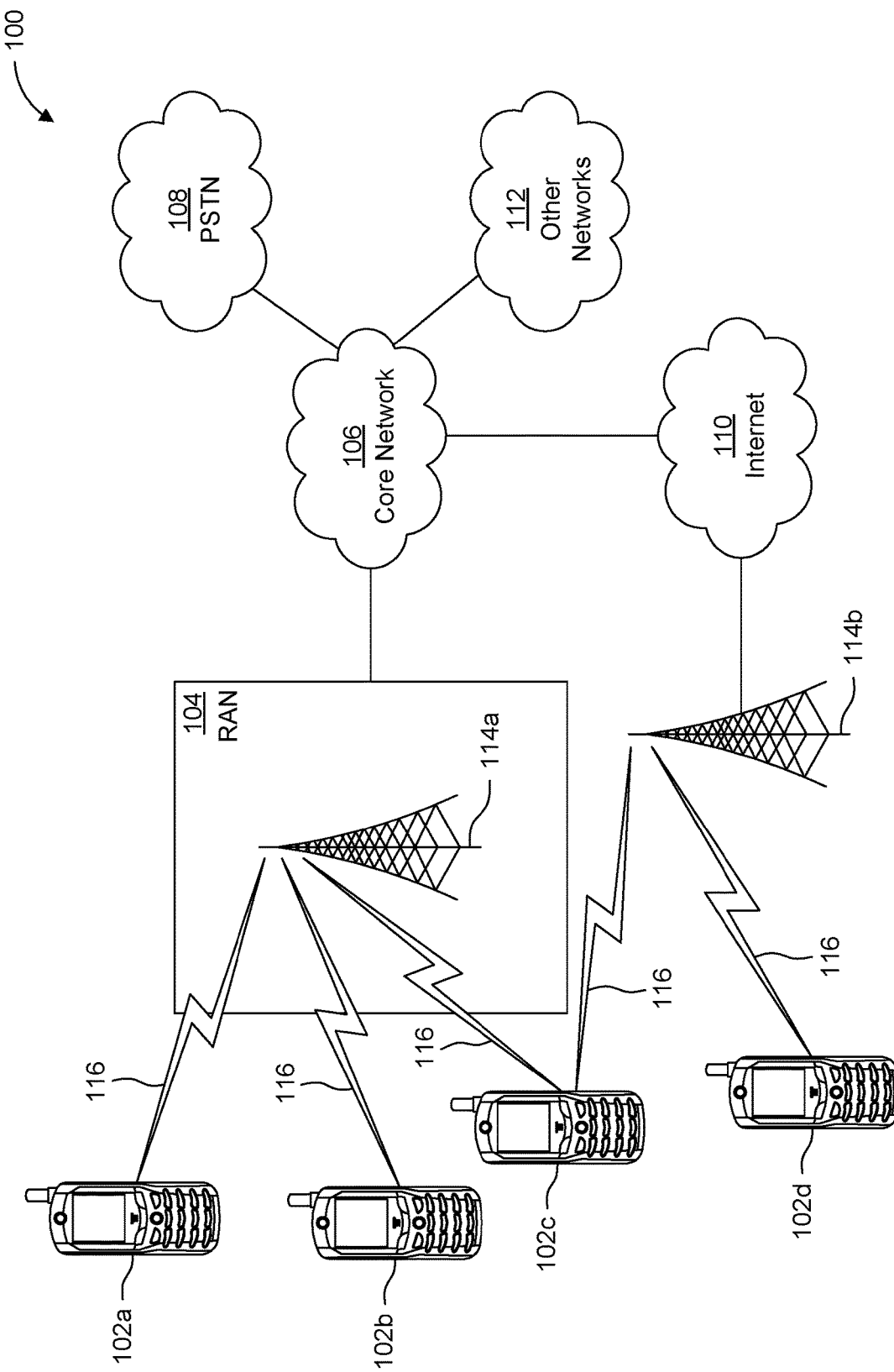
FIG. 1A is a system diagram illustrating an example communications system in which one or more disclosed embodiments may be implemented.

Although various embodiments are described and/or claimed herein in which an apparatus, system, device, etc. and/or any element thereof carries out an operation, process, algorithm, function, etc. and/or any portion thereof, it is be understood that any embodiments described and/or claimed herein assume that any apparatus, system, device, etc. and/or any element thereof is configured to carry out any operation, process, algorithm, function, etc. and/or any portion thereof.
Example Communications Networks FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications system 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
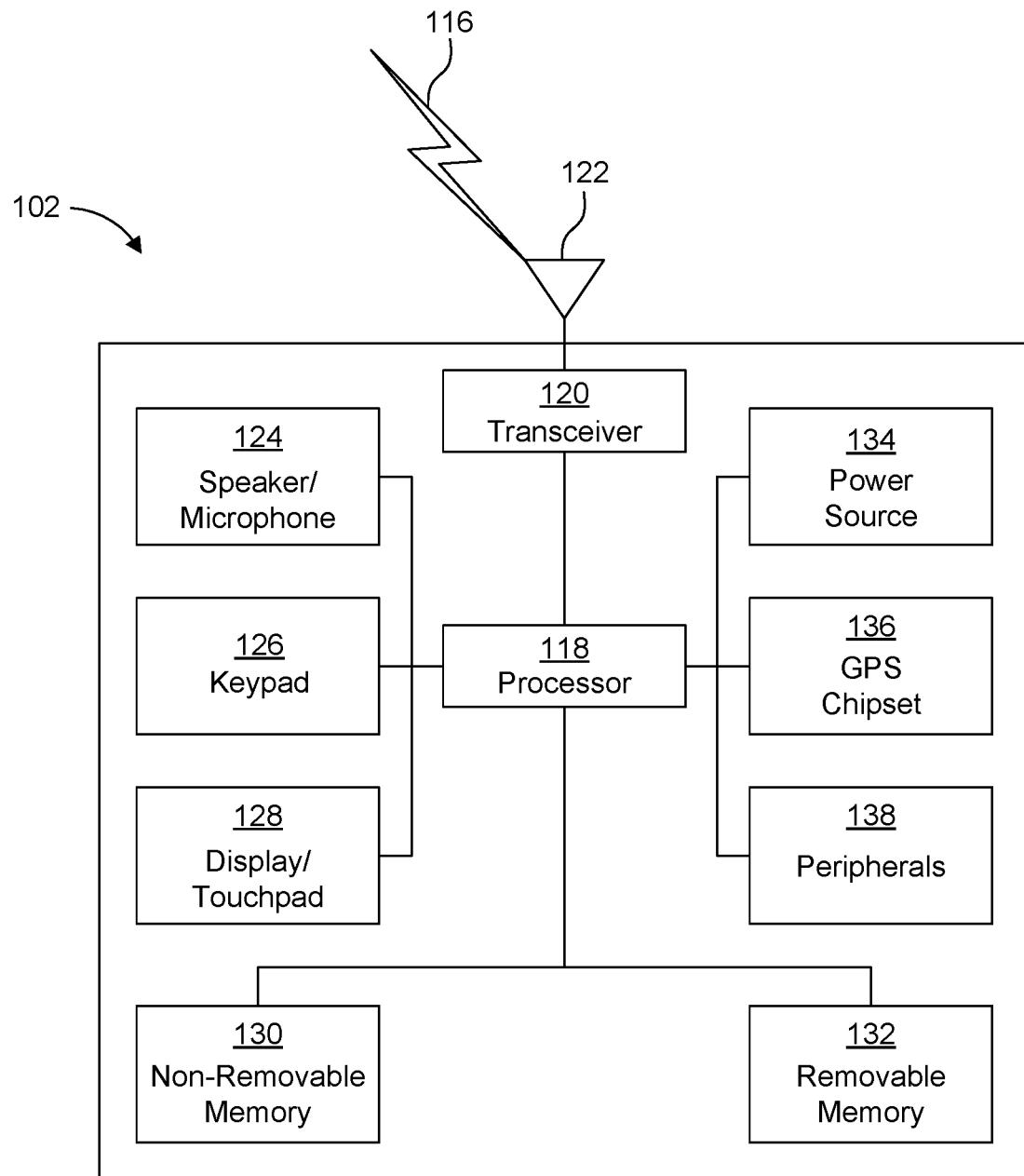
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
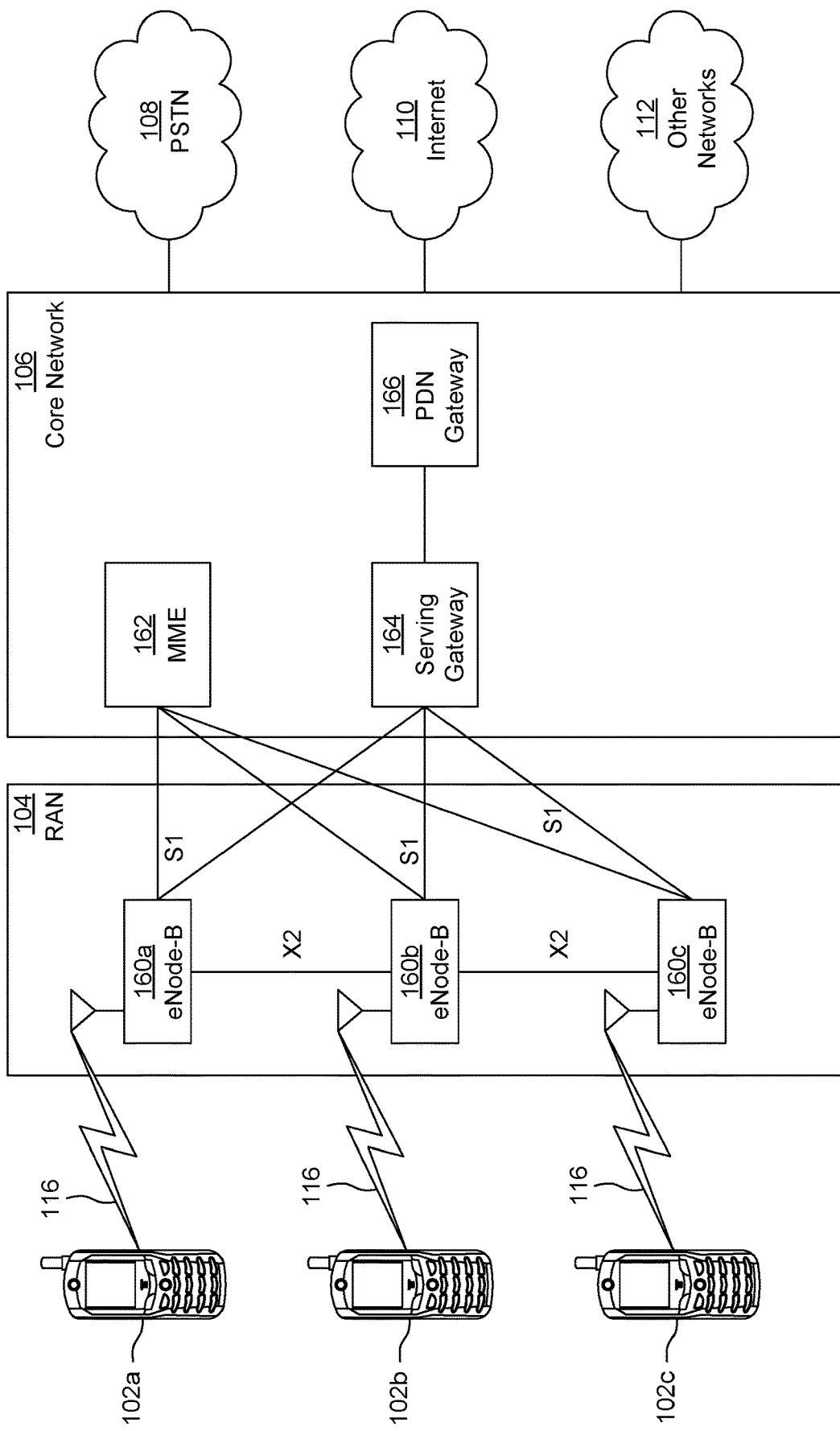
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBS S) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country.

Figure 1D:
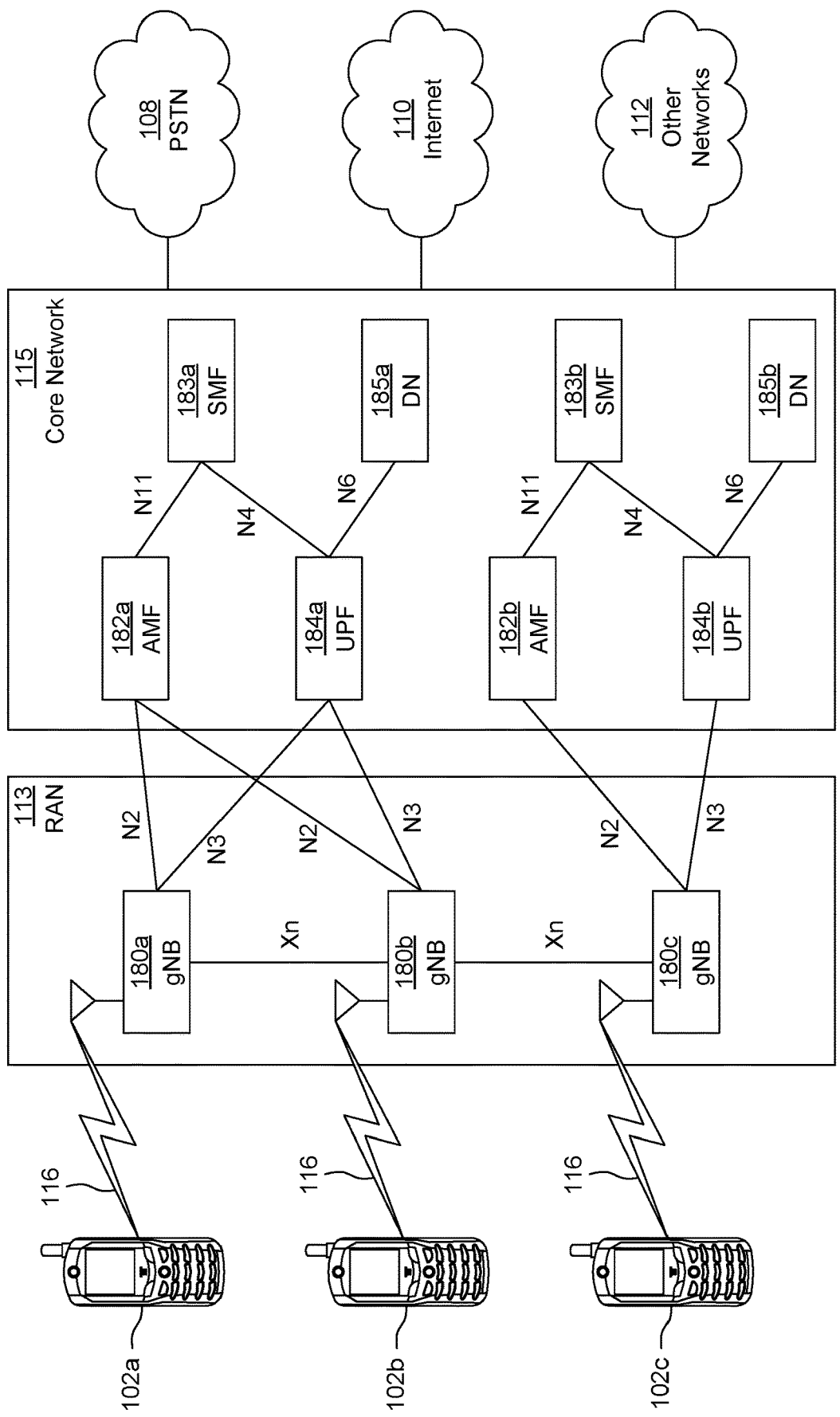
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In Rel-15, New Radio (NR) has introduced radio access technology (RAT) in frequency range 2 (FR2), where FR2 denotes the frequency range of 24.25-52.6 GHz. One challenge with using FR2 is high propagation loss (e.g., higher than frequency range 1 (FR1)). Since propagation loss increases as carrier frequency increases, transmissions in FR2 experience the higher propagation loss. Efficient usage of highly directional beamformed transmission and reception may be a solution for mitigating the higher propagation loss.

Beamforming gain can be achieved by adding or subtracting one signal from another signal. Since more beamforming gain can be achieved as more signals are added or subtracted, utilization of large number of antenna elements are essential for the highly directional beamformed transmission. Controlling signal addition or signal subtraction can be done by controlling phases of antenna elements.

Figure 2:
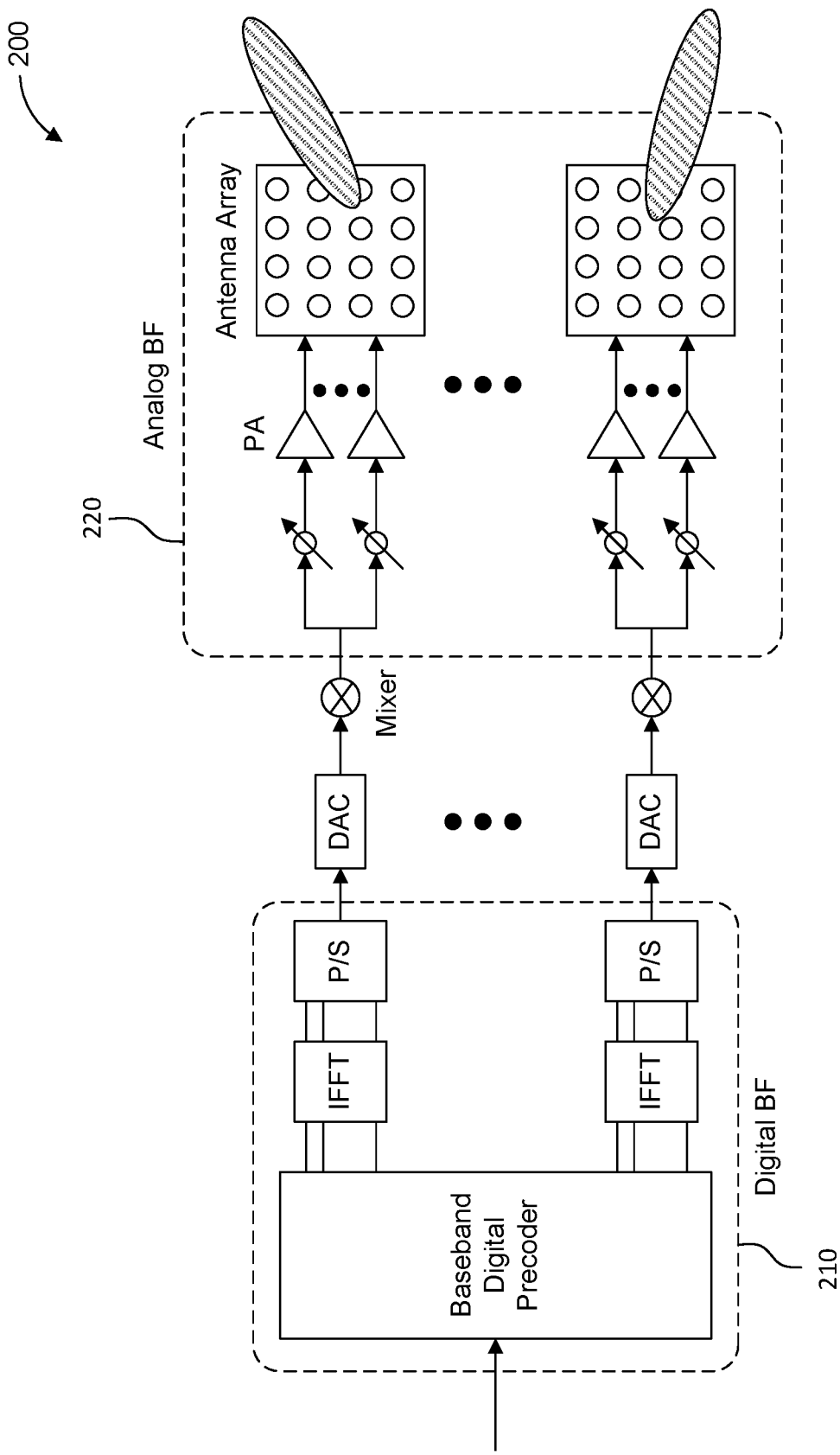
FIG. 2 is a block diagram illustrating an example hybrid beamforming architecture.

FIG. 2 is a block diagram illustrating an example hybrid beamforming architecture 200. The hybrid beamforming architecture 200 may include a digital beamforming part 210 and an analog beamforming part 220. The digital beamforming part 210 may control a phase of a signal by applying digital precoder. The analog beamforming part 220 may control a phase of a signal using phase shifters. The hybrid beamforming architecture 200 may achieve large beamforming gains with reasonable flexibility (e.g., applying different phases for different frequency resource blocks) and implementation complexity. A consequence of applying a large beamforming gain is that an area (volume) covered by a beam may be limited given that a width of a beam ("beam width") is inversely proportional to beamforming gain.

A base station and a WTRU may utilize multiple beams to cover an entire cell. Broadcast signals, such as synchronization signal blocks (SSBs), may be transmitted in various directions (e.g., via beam sweeping) to cover an entire cell. For a unicast transmission between the base station and the WTRU, procedures to optimize beam direction to the WTRU may be provided through beam management.

Beam management may include selection and maintenance of the beam direction for unicast transmissions (including control channel transmissions and/or data channel transmissions) between the base station and the WTRU. Beam management procedures may be categorized into beam determination, beam measurement and reporting, beam switching, beam indication, and beam recovery.

In beam determination, the base station and the WTRU find a beam direction to ensure good/sufficient radio link quality for unicast control transmissions and/or data channel transmissions. After a link is established, the WTRU measures link qualities of multiple transmission (Tx) and reception (Rx) beam pairs and reports the measurement results to the base station. Mobility of the WTRU, orientation of the WTRU and channel blockage can change (affect) the radio link qualities of Tx and Rx beam pairs. When the quality of a current beam pair degrades, the base station and the WTRU may switch to another beam pair having a better radio link quality. The base station and the WTRU may monitor the quality of the current beam pair along with qualities of one or more other beam pairs and may perform switching when necessary. When the base station assigns a Tx beam to the WTRU via DL control signaling, a beam indication procedure is used. Beam recovery entails performing a recovery procedure when a link between the base station and the WTRU can no longer be maintained.

Pursuant to radio link monitoring (RLM), a WTRU may perform channel quality measurements of its serving cell and may assess whether the network is able to reach the WTRU with a control channel transmission.

When the link quality is lower than a threshold, the WTRU may initiate a contention-based RACH procedure and may trigger a higher-layer reconnection procedure. The higher-layer reconnection procedure may include initiating cell re-selection to a new cell and performing a radio resource configuration (RRC) reconfiguration. Carrying out the higher-layer reconnection procedure may introduce delays that may result in latency issues, etc.

Tracking of a beam ("beam tracking") at the WTRU may fail due to partial or complete attenuation of the beam (e.g., due to blockage, such as by a moving object), especially when the beam has a narrow beam width, as might occur when using FR2. The contention-based RACH procedure and cell re-selection to a new cell need not be carried out in response to a beam tracking failure (or other type of beam failure) if another beam from the same cell may be used to reach the WTRU. Recovery from a beam failure ("beam failure recovery" or "BFR") may be carried out instead using any of layer 1 (L1) and layer 2 (L2) procedures (e.g., any of PHY layer and MAC layer procedures).

Pursuant to a BFR procedure, the WTRU may monitor a set of reference signals (RSs) associated with Tx beams associated with control channel transmissions. The RSs may be periodic RSs and/or RSs specific to the WTRU (WTRU-specific RSs), and may be, for example, any of an SSB and/or a channel state information (CSI) reference signal (CSI-RS).

The WTRU may obtain, via (e.g., higher layer) signaling, one or more sets $\bar{q}_0$ of indexes corresponding to RSs to monitor. For example, the WTRU may obtain, for each of one or more bandwidth parts (BWP) of a serving cell, a set $\bar{q}_0$ of indexes ("RS-indexes set $\bar{q}_0$") via an information element (IE) of the signaling. The RS-indexes set $\bar{q}_0$ may include any of (e.g., periodic) CSI-RS resource indexes and SS/PBCH block indexes indicated and/or specified by a failureDetectionResources IE or like-type IE. Alternatively, the RS-indexes set $\bar{q}_0$ may include (e.g., periodic) CSI-RS resource indexes indicated by configured transmission configuration indicator (TCI) states (or by signaled TCI states IEs) for respective control resource sets (CORESETs) that the WTRU may use for monitoring physical downlink control channel (PDCCH) transmissions. For any of the TCI states in which two RS indexes are specified and/or indicated, the CSI-RS resource indexes indicated by such TCI states (or TCI states IEs) may correspond to the RS indexes having a quasi-colocation (QCL) type D (QCL-Type D) configuration.

The WTRU may evaluate beam qualities based on measurements of the RSs corresponding to the RS-indexes set $\bar{q}_0$. The WTRU may declare a beam failure after determining that (responsive to, on condition that, etc.) the beam qualities of all RSs corresponding to the RS-indexes set $\bar{q}_0$ are poor (e.g., fail to satisfy a threshold). The WTRU may identify and/or select a new (e.g., alternative) candidate Tx beam. A WTRU may make measurements for evaluating beam quality of a beam based on an RS associated with the beam.

The WTRU may obtain, via (e.g., higher layer) signaling, one or more RS-indexes sets $\bar{q}_1$ from which the new candidate Tx beam may be identified and selected. The RSs corresponding to the RS-indexes sets $\bar{q}_1$ may be periodic RSs and/or WTRU-specific RSs, and may be, for example, any of an SSB and/or a CSI-RS. The WTRU may obtain, for each of one or more BWPs of a serving cell, an RS-indexes set $\bar{q}_1$ via an IE of the signaling. The RS-indexes set $\bar{q}_1$ may include any of (e.g., periodic) CSI-RS resource indexes and SS/PBCH block indexes indicated and/or specified by a candidateBeamRSList IE or like-type IE. The IE (e.g., candidateBeamRSList IE or like-type IE) may be included in an RRC configuration for radio link quality measurements on the BWP of the serving cell.

The WTRU may be provided with a hypothetical block error rate (BLER) threshold and a reference signal received power (RSRP) threshold during an RRC configuration (e.g., in an RRC configuration message). For simplicity of exposition herein, the terms "RRC configuration" are used to refer to any of an RRC configuration and an RRC reconfiguration.

The WTRU may use the hypothetical BLER threshold and/or the RSRP threshold to monitor and/or measure the RSs corresponding to the RS-indexes sets $\bar{q}_1$ and/or select the new candidate Tx beam. As an example, the WTRU may be provided with thresholds $Q_{out,LR}$ and $Q_{in,LR}$. The thresholds $Q_{out,LR}$ and $Q_{in,LR}$ may correspond to a default value of an rlmInSyncOutOfSyncThreshold IE and a value provided by an rsrp-ThresholdSSB IE, respectively. The WTRU may assess the radio link quality based on at least one of the thresholds $Q_{out,LR}$ and $Q_{in,LR}$. The WTRU may assess the radio link quality according to the RS-indexes set $\bar{q}_0$ against the threshold $Q_{out,LR}$, for instance. Additionally, the WTRU may apply the $Q_{in,LR}$ threshold to a L1-RSRP measurement of a SS/PBCH block and/or a CSI-RS resource of set $\bar{q}_1$ after scaling a respective CSI-RS reception power with a scaling factor. The scaling factor may be a value provided by a powerControlOffsetSS IE or like-type IE.

After identifying and selecting the new candidate Tx beam, the WTRU may transmit a BFR request message to the serving cell via a dedicated physical random access channel (PRACH) transmission. The WTRU may provide (report) RS indexes from the RS-indexes set $\bar{q}_1$ and corresponding L1-RSRP measurements. The WTRU, for example, may provide periodic CSI-RS indexes and/or SS/PBCH block indexes from the RS-indexes set $\bar{q}_1$ and corresponding L1-RSRP measurements that are larger than or equal to the $Q_{in,LR}$ threshold. The reporting of the RS indexes (e.g., the periodic CSI-RS index and/or SS/PBCH block indexes) may be based on associations between PRACH resources and the RS indexes. As an example, the WTRU may receive information indicating a configuration for PRACH transmission, including information indicating an SSB or a CSI-RS resource with an associated PRACH resource (e.g., preamble index for PRACH transmission). The WTRU may receive the configuration in a PRACH-ResourceDedicatedBFR IE or like-type IE of an RRC configuration message. The WTRU may provide (report) the RS indexes from the RS-indexes set $\bar{q}_1$ and the corresponding L1-RSRP measurements using associated PRACH resources of a PRACH transmission.

A base station may receive the BFR request message via the PRACH transmission. The base station may transmit a recovery response to the WTRU. The base station, for example, may transmit the recovery response via a PDCCH transmission. As an example, the base station may transmit the recovery response via the PDCCH transmission through a CORESET and/or a search space set. The WTRU may be informed of the CORESET through a link to a search space set (e.g., provided by a recoverySearchSpaceId IE during an RRC configuration (e.g., in an RRC configuration message)). The WTRU may monitor the search space set, where monitor may imply decoding of one or more PDCCH transmissions in the CORESET. If the recovery response is successfully received by the WTRU, the beam recovery procedure may be deemed successful, and a new beam pair link may be established. Otherwise, the WTRU may revert to and repeat identifying and selecting another new candidate Tx beam, sending another beam recovery request to the base station via PRACH resources of another PRACH transmission, and monitoring the search space set until the WTRU successfully receives a recovery response or until some other criteria is satisfied (e.g., after expiration of a timer (time period), running out of new candidate Tx beams, satisfying a threshold amount of times the recovery response is not successfully received, etc.). If one or more of the other criteria are satisfied and/or the WTRU fails to receive the recovery response, the beam recovery procedure may be deemed unsuccessful and/or the WTRU may initiate the contention-based RACH procedure and/or perform cell reselection. As used herein, a timer generally refers to a triggering event followed by a configurable amount of time that may elapse following the triggering event (e.g., as measured as an offset from the triggering event).

The WTRU may be configured with a counter (e.g., a BFI COUNTER) to use for counting beam failures ("beam-failure counter"). The beam-failure counter may be configured during an RRC configuration (e.g., via an RRC configuration message). The WTRU may receive information indicating a threshold defining an upper limit for the beam-failure counter ("the beam-failure-counter threshold"), such as a beamFailureInstanceMaxCount or like-type threshold.

The WTRU may receive the information from a base station, e.g., during RRC configuration (e.g., during a RRC configuration for the BFR procedure).

The initial value of the beam-failure counter may be set to 0. The WTRU may increment the beam-failure counter by 1 for each detected beam failure. The WTRU may determine whether the beam-failure counter has reached or otherwise satisfies the beam-failure-counter threshold (e.g., the beamFailureInstanceMaxCount threshold). The WTRU may report a beam failure (e.g., via PRACH resources of a PRACH transmission) to the base station if the beam-failure-counter threshold is satisfied. The WTRU need not report a beam failure to the base station if the beam-failure-counter threshold is not satisfied. The beam-failure counter may be reset upon expiration of a beam failure detection timer. The WTRU may be provided with a value for the beam failure detection timer via a beamFailureDetectionTimer IE or like-type IE (e.g., during an RRC configuration). The WTRU may start the beam failure detection timer after detecting a first beam failure and may reset the beam-failure counter (e.g., set it to "0") responsive to expiration of the beam failure detection timer.

The WTRU may be provided with a value for BFR timer (e.g., via a beamFailureRecoveryTimer IE) during an RRC configuration. The WTRU may start the BFR timer responsive to the WTRU starting a random access procedure to transmit PRACH transmissions for BFR. When the BFR timer expires (e.g., responsive to expiration of the BFR timer), the WTRU may stop the BFR procedure and may start a contention-based RACH procedure.

Figure 3:
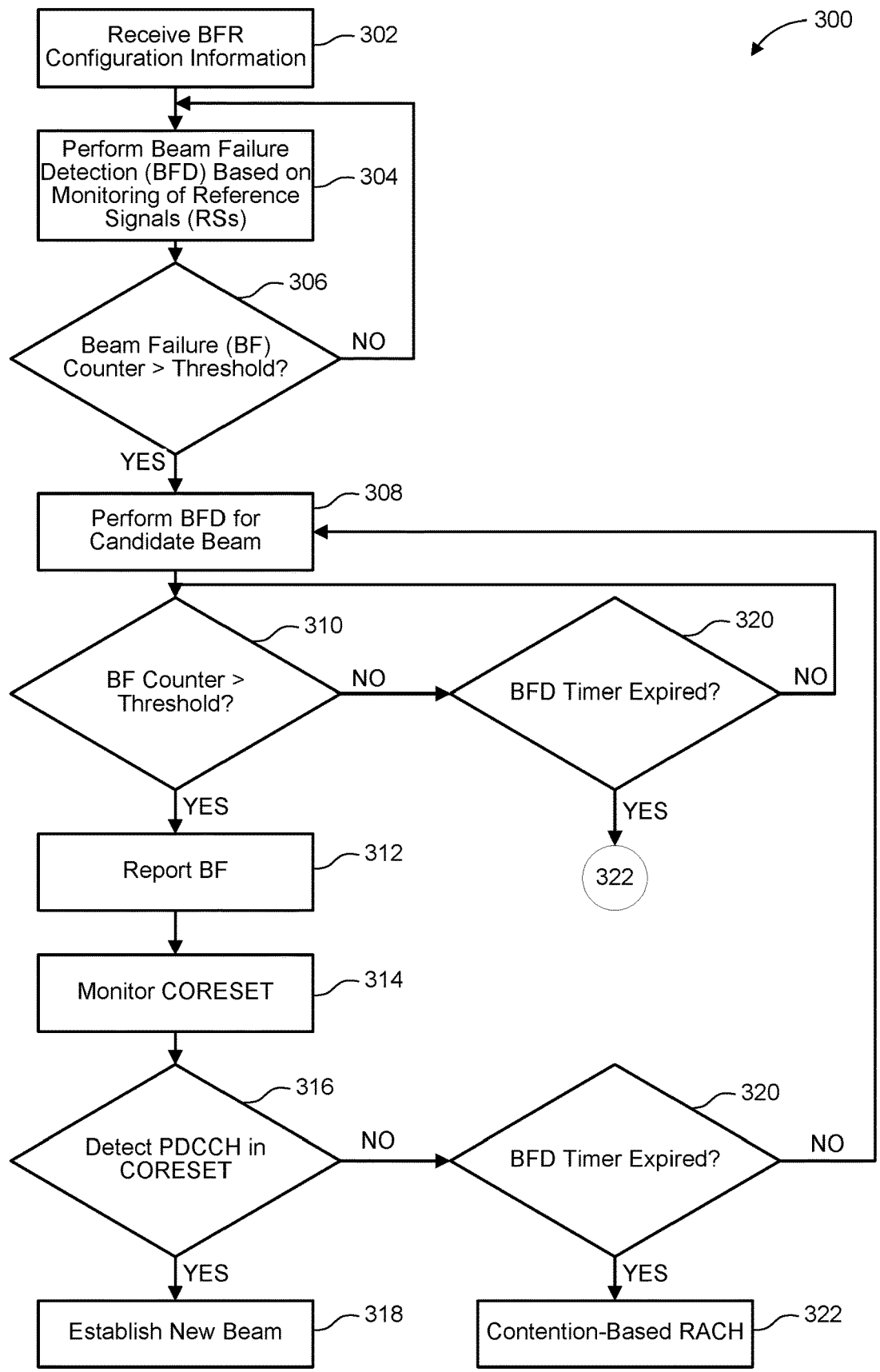
FIG. 3 is a flow chart illustrating an example beam failure recovery (BFR) procedure.

FIG. 3 is a flow chart illustrating an example beam failure recovery (BFR) procedure 300. The BFR procedure 300 may be suitable for performing BFR in a primary cell and may be carried out by a WTRU. According to the BFR procedure 300, the WTRU may receive various RRC configuration information (302). The RRC configuration information may include, for example, information indicating a value for a beam-failure counter and a value for a BFR timer. The WTRU may perform BFR detection based on monitoring RSs (304) The WTRU, e.g., may perform BFR detection based on monitoring RSs corresponding to the RS-indexes set $\bar{q}_0$. The WTRU may increment the beam-failure counter by 1 for each detected beam failure. The WTRU may determine whether the beam-failure counter has reached or otherwise satisfies the beam-failure-counter threshold (306) (e.g., the beamFailureInstanceMaxCount threshold). If the beam-failure-counter threshold is satisfied, the WTRU may move on to identifying and/or selecting a new candidate Tx beam (308). The beam-failure counter may or may not be reset in response to moving on to identify and/or select a new candidate Tx beam and/or selecting a new candidate Tx beam.

The WTRU may select a new candidate Tx beam and may determine whether the beam-failure counter has reached or otherwise satisfies the beam-failure-counter threshold (310) (e.g., the beamFailureInstanceMaxCount threshold). The WTRU may report a beam failure (e.g., via PRACH resources of a PRACH transmission) to the base station (312) if the beam-failure-counter threshold is satisfied. The WTRU may monitor the search space set (314), where monitor may imply decoding one or more PDCCH transmissions in the CORESET (316). If a recovery response is successfully received by the WTRU, the beam recovery procedure may be deemed successful, and a new beam pair link may be established (318). Otherwise, the WTRU may continue as if the beam-failure-counter threshold is not satisfied. If the beam-failure-counter threshold is not satisfied, the WTRU may determine whether the beam failure detection timer has expired (320). If the beam failure detection timer has expired, the WTRU may stop the BFR procedure and may start a contention-based RACH procedure (322). Otherwise, the WTRU may revert to selecting another new candidate Tx beam (308) and/or may determine whether the beam-failure counter has reached or otherwise satisfies the threshold (310).

A WTRU may support BFR procedures for one or more secondary sells (SCells). Pursuant to a BFR procedure for the SCells, the WTRU may monitor a set of RS associated with Tx beams associated with control channel transmissions. The RSs may be periodic RSs and/or WTRU-specific RSs, and may be, for example, any of an SSB and/or a CSI-RS.

The WTRU may obtain, via (e.g., higher layer) signaling, one or more RS-indexes sets $\bar{q}_0$ corresponding to the RSs to monitor. For example, the WTRU may obtain an RS-indexes set $\bar{q}_0$ for one or more SCells, e.g., via an IE of the signaling. The RS-indexes set $\bar{q}_0$ may include any of (e.g., periodic) CSI-RS resource indexes and SS/PBCH block indexes for the SCells. Alternatively, the RS-indexes set $\bar{q}_0$ may include (e.g., periodic) CSI-RS resource indexes indicated by configured TCI states (or by signaled TCI states Ies) for respective CORESETs that the WTRU may use for monitoring PDCCH transmissions. For any of the TCI states in which two RS indexes are specified and/or indicated, the CSI-RS resource indexes indicated by such TCI states (or TCI states IEs) may correspond to the RS indexes having a QCL-Type D configuration.

The WTRU may evaluate beam qualities based on measurements of the RSs corresponding to the RS-indexes set $\bar{q}_0$. The WTRU may declare a beam failure after determining that (responsive to, on condition that, etc.) the beam qualities of all RSs corresponding to the RS-indexes set $\bar{q}_0$ are poor (e.g., fail to satisfy a threshold). The WTRU may identify and/or select a new candidate Tx beam.

The WTRU may obtain, via (e.g., higher layer) signaling, one or more RS-indexes sets $\bar{q}_1$ from which the new candidate Tx beam may be identified and selected. The RSs corresponding to the RS-indexes sets $\bar{q}_1$ may be periodic RSs and/or WTRU-specific RSs, and may be, for example, any of an SSB and/or a CSI-RS. The WTRU may obtain a RS-indexes set $\bar{q}_1$ via an IE of the signaling. The RS-indexes set $\bar{q}_1$ may include any of (e.g., periodic) CSI-RS resource indexes and SS/PBCH block indexes indicated and/or specified by a candidateBeamRSSCellList-r16 IE or like-type IE. The IE (e.g., candidateBeamRSSCellList-r16 IE or like-type IE) may be included in an RRC configuration for radio link quality measurements on the BWP of the serving cell.

The WTRU may be provided a hypothetical BLER threshold and a RSRP threshold during an RRC configuration (e.g., in an RRC configuration message). The WTRU may use the hypothetical BLER threshold and/or the RSRP threshold to monitor and/or measure the RSs corresponding to the RS-indexes sets $\bar{q}_1$ and/or select the new candidate Tx beam. As an example, the WTRU may be provided with thresholds $Q_{out,LR}$ and $Q_{in,LR}$. The thresholds $Q_{out,LR}$ and $Q_{in,LR}$ may correspond to a default value of an rlmInSyncOutOfSyncThreshold IE and a value provided by an rsrp-ThresholdBFR-r16 IE, respectively. The WTRU may assess the radio link quality based on at least one of the thresholds $Q_{out,LR}$ and $Q_{in,LR}$. The WTRU may assess the radio link quality according to the RS-indexes set $\bar{q}_0$ against the threshold $Q_{out,LR}$, for instance. Additionally, the WTRU may apply the $Q_{in,LR}$ threshold to a L1-RSRP measurement of a SS/PBCH block and/or a CSI-RS resource of set $\bar{q}_1$ after scaling a respective CSI-RS reception power with a scaling factor. The scaling factor may be a value provided by a powerControlOffsetSS IE or like-type IE.

After identifying and selecting the new candidate Tx beam, the WTRU may transmit one or more scheduling requests (SRs) to a base station. One or more resources for transmitting the SRs for carrying out BFR of the SCells ("SCell BFR") may be (pre)configured during RRC configuration (e.g., via an RRC configuration message). For example, the WTRU may be provided with a schedulingRequestID-BFR-Scell-r16 IE during RRC configuration (e.g., in an RRC configuration message from a base station). The WTRU may transmit the SRs using resources configured based on the schedulingRequestID-BFR-Scell-r16 IE. The WTRU may transmit the SRs in PUCCH resources allocated for normal/other SRs (e.g., SRs for uplink eMBB transmission), for example, if the WTRU is not allocated dedicated resources for the BFR SRs. The WTRU may transmit the SRs and may receive a PDCCH scheduling uplink resource for transmitting one or more medium access control (MAC) control elements (MAC CEs) messages to the base station.

The WTRU may support a BFR MAC CE to report the BFR and selected beams to a base station. The BFR MAC CE may indicate one or more of the SCells that are experiencing beam failure (e.g., one or more of the SCells on which a beam failure was detected by the WTRU). For the one or more SCells, the BFR MAC CE may report or indicate zero or more new candidate beams. The BFR MAC CE may report or indicate zero new candidate beams, for example, when measurements of all monitoring RSs for a SCell are below or otherwise fail to satisfy a threshold.

Figure 4:
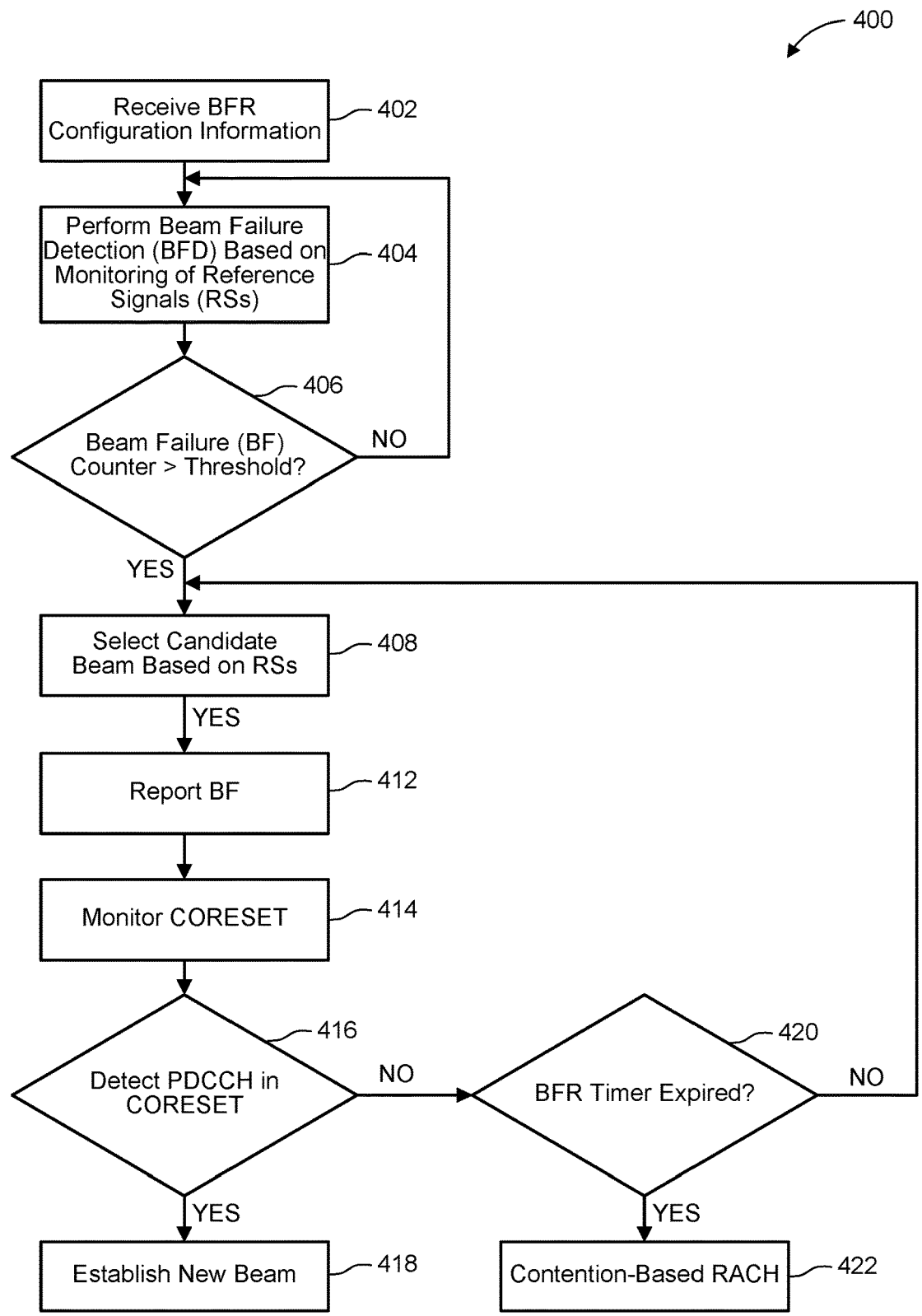
FIG. 4 is a flow diagram illustrating an example beam failure recovery (BFR) procedure.

FIG. 4 is a flow diagram illustrating an example beam failure recovery (BFR) procedure 400. The BFR procedure 400 may be suitable for carrying out BFR for an Scell. According to the BFR procedure 400, the WTRU may receive various RRC configuration information (402). The RRC configuration information may include, for example, information indicating a value for a beam-failure counter and a value for a BFR timer. The WTRU may perform BFR detection based on monitoring RSs (404). The WTRU, e.g., may perform BFR detection based on monitoring RSs corresponding to the RS-indexes set $\bar{q}_0$. The WTRU may increment the beam-failure counter by 1 for each detected beam failure. The WTRU may determine whether the beam-failure counter has reached or otherwise satisfies the beam-failure-counter threshold (406) (e.g., the beamFailureInstanceMaxCount threshold). If the beam-failure-counter threshold is satisfied, the WTRU may move on to identifying and/or selecting a new candidate Tx beam (408). The beam-failure counter may or may not be reset in response to moving on to identify and/or select a new candidate Tx beam and/or selecting a new candidate Tx beam.

The WTRU may select a new candidate Tx beam. The WTRU may report a beam failure (412) (e.g., by transmitting one or more SRs). The WTRU may monitor a search space set (414), where monitor may imply decoding one or more PDCCH transmissions in the CORESET. The WTRU may determine whether a PDCCH transmissions in the CORESET includes a recovery response (416). If a recovery response is successfully received by the WTRU, the BFR procedure may be deemed successful, and a new beam pair link may be established (418). Otherwise, the WTRU may determine whether the beam failure detection timer has expired (420). If the beam failure detection timer has expired, the WTRU may stop the BFR procedure and may start a contention-based RACH procedure (422). Otherwise, the WTRU may revert to selecting another new candidate Tx beam proceed from there.

Beam management may be a way to support mobility without RRC involvement. In FR2, due to narrow beamwidth to increase beamforming gain, multiple beams may be needed to cover the entire cell. Beam management may enable mobility between the multiple beams with a lightweight process that does not require RRC reconfiguration. BFR may support a dynamic recovery mechanism when the beams at a base station and a WTRU become misaligned. However, when mobility between multiple cells is needed, L1 and/or L2 based beam management and BFR are not supported and mobility between multiple cells requires a handover procedure with RRC reconfiguration that requires a large amount of signaling overhead and increases latency. In order to reduce the overhead and the latency, L1/L2 based inter-cell mobility may be considered.

Currently, a WTRU may comply with radiation exposure limits (at least in part by) using a power management-maximum power reduction (P-MPR) feature. Compliance with specific absorption rate (SAR) and/or maximum permissible exposure (MPE) limits may lead to power reductions that are triggered based on proximity sensors of the WTRU. The P-MPR is not directly reported (e.g., as an absolute value in dB) for frequencies in FR1 (e.g., below 6 GHz (or 10 Ghz in some geographical regions)). The P-MPR is part of the power headroom report (PHR) and can be determined by a base station based on the RF properties specific to FR1. For MPE, in frequencies above 24 GHz (FR2), the P-MPR may be reported as an absolute value, possibly along with PHR, due to the nature of an RF front end and high tolerances in FR2.

Reporting of a power headroom report (PHR) for SAR and/or a PHR-like report for MPE may be driven by MAC specific reporting timers. Currently, reporting of a PHR for SAR with proximity sensors detection has the following triggering properties:

phr-ProhibitTimer expires or has expired, when the MAC entity has UL resources for new transmission, and the following is true for any of the activated Serving Cells of any MAC entity with configured uplink:

there are UL resources allocated for transmission or there is a PUCCH transmission on this cell, and the required power backoff due to power management (as allowed by P-MPR$_c$ as specified in TS 38.101-1 [4], TS 38.101-2 [5], and TS 38.101-3 [6]) for this cell has changed more than phr-Tx-PowerFactorChange dB since the last transmission of a PHR when the MAC entity had UL resources allocated for transmission or PUCCH transmission on this cell.

NOTE 2: The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

As is discernible from above, the prohibit timer is used to avoid a ping pong signalling situation. As described by Note 2 above, an extra triggering condition related to an activation timer (e.g., delay) is applied to avoid triggering of the PHR or MPE signalling due to an occasional short-term human body proximity detection. For the MPE case, where an absolute level of P-MPR is reported, similar triggering conditions may be accounted for, thus an activation delay timer and a prohibit timer may be used for the same reasons as in the SAR related PHR.

Figure 5:
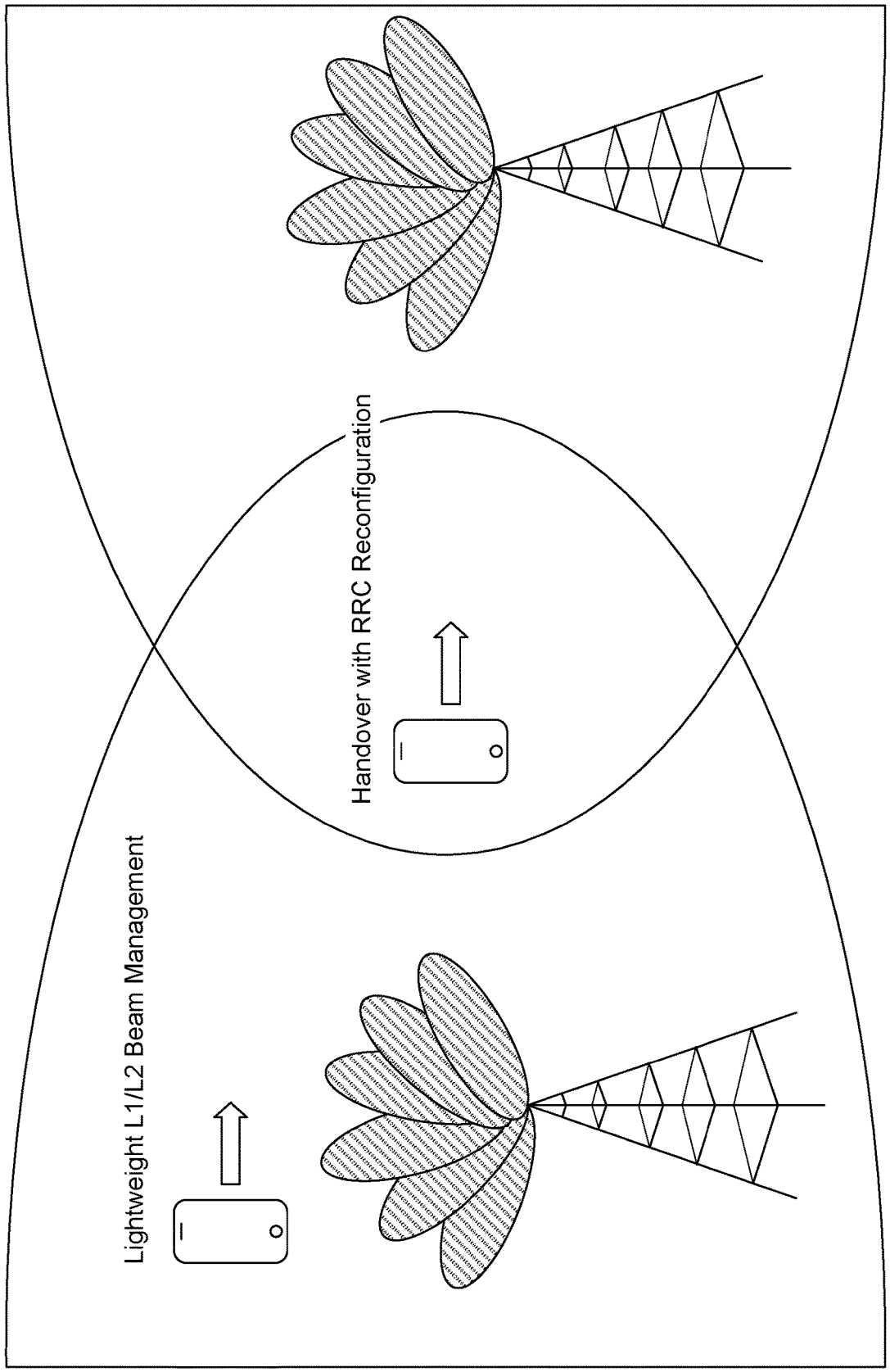
FIG. 5 illustrates example inter-cell beam management and inter-cell handover.

FIG. 5 illustrates example inter-cell beam management and inter-cell handover.

In existing technologies, a group of BFR configurations may be utilized to support a BFR operation for one or more cells. However, supporting the BFR operation for the one or more cells may require increased power consumption by/at the WTRU and WTRU complexity as number of cells increases. For example, as number of cells increases, resources for monitoring, selecting new candidate beams, reporting the new candidate beams and receiving confirmations also increase. Therefore, there may be a need to enhance the design of BFR process to provide efficient BFR procedures for multiple cells with low power consumption and low complexity.

Methods, apparatuses, systems, etc. directed to beam management in connection with multiple cells and/or multiple transmission/reception points are disclosed herein.

In various embodiments, a method for, and/or for use in connection with, beam management may be implemented in a WTRU and may include any of selecting first and second best beams based on candidate RSs of serving cells and on candidate RSs of other cells (e.g., non-serving cells), respectively; determining an overall best beam based on a comparison of a quality of the best beam of the serving cells and a quality of the best beam of the other cells; reporting the best beam of the serving cells on condition that such best beam is determined to be the overall best beam; and reporting the best beam of the other cells on condition that such best beam is determined to be the overall best beam.

In various embodiments, the determination of the overall best beam is based on a bias towards using the best beam of the serving cells. In various embodiments, the bias towards using the best beam of the serving cells may be a value added to a beam quality of the best beam of the serving cells.

In various embodiments, the determination of the overall best beam may be based on a bias applied to any of the quality of the best beam of the first set of one or more cells and the quality of the best beam of the second set of one or more cells, wherein the bias may be based on one or more P-MPRs associated with any of the first set of one or more cells and the second set of one or more cells.

In various embodiments, the determination of the overall best beam may be based on a bias applied to any of the quality of the best beam of the first set of one or more cells and the quality of the best beam of the second set of one or more cells, wherein the bias may be based on one or more P-MPRs associated with any of a first WTRU panel and a second WTRU panel.

In various embodiments, the first set of one or more cells may include one or more serving cells. In various embodiments, the second set of one or more cells may include one or more non-serving cells.

In various embodiments, a method for, and/or for use in connection with, beam management may be implemented in a WTRU and may include any of selecting first and second candidate beams based on first and second RS sets; adding a bias to (e.g., each) beam qualities of a first RS set; comparing the biased beam qualities of the first RS set to beam qualities of the second RS set; and reporting one or more of the first and/or second candidate beams based on the comparison. In various embodiments, the bias (or any of the multiple biases) may be predefined. In various embodiments, the bias (or any of the multiple biases) may be configured during RRC configuration (e.g., in one or more RRC message). In various embodiments, the bias (or any of the multiple biases) may be reported by the WTRU. In various embodiments, the method may include determining one of the first candidate beams and the second candidate beams as a best beam.

In various embodiments, the bias may be based on one or more P-MPRs associated with any of a first set of one or more cells and a second set of one or more cells. In various embodiments, the first set of one or more cells may include one or more serving cells. In various embodiments, the second set of one or more cells may include one or more non-serving cells.

In various embodiments, the bias may be based on one or more P-MPRs associated with any of a first WTRU panel and a second WTRU panel.

In various embodiments, a method for, and/or for use in connection with, beam management may be implemented in a WTRU and may include any of selecting first and second candidate beams based on first and second reference signal (RS) sets; applying a first bias to beam qualities of a first RS set; applying a second bias to beam qualities of a first RS set; comparing the biased beam qualities of the first RS set to the biased beam qualities of the second RS set; and reporting one or more new of the first and/or second candidate beams based on the comparison. In various embodiments, the method may include determining one of the first candidate beams and the second candidate beams as a best beam.

In various embodiments, the first bias may be predefined, configured in RRC configuration and/or reported by the WTRU. In various embodiments, the second bias may be predefined, configured in RRC configuration and/or reported by the WTRU.

In various embodiments, the first bias may be based on one or more P-MPRs associated with any of a first set of one or more cells and a second set of one or more cells. In various embodiments, the second bias may be based on the one or more P-MPRs associated with any of the first set of one or more cells and the second set of one or more cells.

In various embodiments, the second bias may be based on one or more P-MPRs associated with any of a first set of one or more cells and a second set of one or more cells. In various embodiments, the first set of one or more cells may include one or more serving cells. In various embodiments, the second set of one or more cells may include one or more non-serving cells. In various embodiments, the bias may be based on one or more P-MPRs associated with any of a first WTRU panel and a second WTRU panel.

A WTRU may transmit and/or receive one or more signals (e.g., signals carrying physical channel information, SSBs, RSs, etc.) according to at least one spatial domain filter. A "beam" may be expressed as a spatial domain filter. The WTRU, for example, may receive RSs (e.g., CSI-RSs, SSBs, etc.) using a spatial domain filter and may transmit signals (physical channel information, RSs, etc.) using the same spatial domain filter. The WTRU transmission may be referred to as "target", and the received RS(s) may be referred to as "reference" or "source". In such case, the WTRU may be said to transmit target physical channel information and/or signals according to a spatial relation with a reference to such RSs.

The WTRU may transmit first physical channel information and/or signals according to the same spatial domain filter as a spatial domain filter used for transmitting second physical channel information and/or signals. The first and second transmissions may be referred to as "target" and "reference" (or "source"), respectively. In such case, the WTRU may be said to transmit the first (target) physical channel information and/or signals according to a spatial relation with a reference to the second (reference) physical channel information and/or signals.

A spatial relation may be implicit, configured by RRC, and/or signaled by a MAC CE and/or a DCI. A WTRU, for example, may transmit a PUSCH transmission and/or demodulation reference signal (DM-RS) of a PUSCH transmission according to the same spatial domain filter as a sounding reference signal (SRS) indicated by an SRS resource indicator (SRI) indicated in a DCI and/or configured by RRC. As another example, a spatial relation may be configured by RRC for an SRI or signaled by MAC CE for a PUCCH transmission. Such spatial relation may also be referred to as a "beam indication".

The WTRU may receive first (target) downlink channel information and/or signals according to the same spatial domain filter or spatial reception parameter used for receiving second (reference) downlink channel information and/or signals. For example, such association may exist between a physical channel such as PDCCH or PDSCH and its respective DM-RS. At least when the first and second signals are RSs, such association may exist when the WTRU is configured with a QCL type D between corresponding antenna ports. Such association may be configured as a TCI state. A WTRU may be informed of an association between a CSI-RS or SSB and a DM-RS by indicating a TCI state index of a set of TCI states configured by RRC and/or signaled by MAC CE. The indication of the TCI state index may also be referred to as a "beam indication".

In various embodiments, one or more BFR operations for multiple cells may be carried out. Carrying out the BFR operations may include carrying out any of (i) BFR configuration, (ii) independent BFR operations and (iii) joint BFR operation.

Herein, beam reporting may be interchangeably used with beam indication, new candidate beam reporting, and/or new candidate beam indication for beam failure recovery. Herein, cells may be interchangeably used with (substituted for) transmission/reception points (TRPs), panels, CORESET groups, CORESET pools and higher layer index. Herein, physical cell identities (PCIDs) may be interchangeably used with TRP IDs, panel IDs, CORESET group IDs, CORESET pool IDs and higher layer indexes.

A WTRU may make measurements for evaluating beam quality of a beam based on an RS associated with the beam. The beam quality measurements may include any of L1-RSRP, L1 signal interference to noise ratio (L1-SINR), CQI, radio link quality (e.g., a hypothetical BLER of a DL physical channel transmission and/or a hypothetical BLER of an UL physical channel transmission), etc. The RS used for the beam quality measurements may be associated with one or more CORESETs in an BWP (e.g., an active BWP). The beam quality may be measured based on RSs (e.g., beam reference signals) associated with the CORESETs in the BWP, for which the WTRU may be monitoring.

A WTRU may perform beam reporting (e.g., trigger beam reporting and/or send a beam report) for various reasons. The WTRU, for example, may generate and/or transmit a preferred-beam report that may indicate one or more preferred beams for transmission by and/or reception at the WTRU. The preferred-beam report may be included as an information element (IE) in another beam report with or without other types of beam reports. The preferred-beam report may be in any of various forms and/or need not be in any specific form.

The preferred-beam report may (e.g., explicitly, implicitly, directly, indirectly, etc.) indicate and/or identify the preferred beams. The preferred-beam report, for example, may include one or more beam indexes corresponding to the preferred beams ("preferred-beams indexes"). The WTRU may transmit (report) the preferred-beam indexes (preferred-beams report) to a base station using an UL physical channel transmission (e.g., any of a PUCCH transmission, a PUSCH transmission and a PRACH transmission).

Alternatively, the preferred-beam report may be information (e.g., referential information) that may implicitly indicate the preferred beams. For example, a WTRU may be configured with a set of UL resources associated with a respective set of beams. The WTRU may select, from the set of UL resources, one or more UL resources corresponding to the preferred beams. The WTRU may transmit one or more signals to a base station using the one or more UL resources corresponding to the preferred beams. The base station may receive the signals and may determine preferred-beams indexes based on (i) the UL resources used for the received signals and (ii) the correspondence between such UL resources and the preferred beams.

In various embodiments, a WTRU may be configured with, or otherwise obtain, one or more PRACH resources associated with one or more candidate beam indexes. The WTRU may select the PRACH resources based on determined candidate beam indexes. The WTRU may select (determine) one or more of the PRACH resources corresponding to the preferred beams. The WTRU may transmit one or more signals to a base station using the selected one or more PRACH resources. The base station may receive the signals. The base station may determine preferred-beams indexes based on (i) the PRACH resources used for the signals and (ii) the correspondence between such PRACH resources and the preferred beams (e.g., the determined candidate beam).

In various embodiments, a WTRU may be configured with, or otherwise obtain, a set of sequences that may be associated with a respective set of beams. The WTRU may select, from the set of sequences, one or more sequences corresponding to the preferred beams. The WTRU determine the one or more based on the one or more selected candidate beam indexes, for example. The WTRU may transmit one or more signals to a base station using the selected one or more sequences. The base station may receive the signals. The base station may determine preferred-beams indexes based on the sequences used for the received signals and the correspondence between such sequences and the preferred beams (e.g., the selected new candidate beam).

In various embodiments, a WTRU may transmit to a base station information indicating an RS index, an RS resource index and/or an RS resource set index. An RS (e.g., each RS) indicated by the RS index, RS resource index and/or RS resource set index may be an SSB or another type of RS, such as, e.g., a CSI-RS, a tracking reference signal (TRS), a DM-RS, an SRS, a phase tracking-reference signal (PT-RS), a positioning reference signal (PRS), etc.). The base station may receive information indicating the RS index, an RS resource index and an RS resource set index. The base station may determine preferred-beams indexes based on the RS index, RS resource index and/or RS resource set index. Alternatively (or additionally), the base station may determine preferred-beams indexes based on an RS (or a plurality of RSs if more than one RS is) indicated by the RS index, RS resource index and/or RS resource set index.

One or more of the following configurations ("BFR configurations") may be used for BFR:

A WTRU may be configured with one or more sets of beam failure detection (BFD) RSs (each a "BFD-RS set"). For example, the WTRU may be configured with one or more RS-indexes sets $\bar{q}_{0,i}$ corresponding to the one or more BFD-RS sets. Each RS-indexes set $\bar{q}_{0,i}$ may correspond to the BFD-RS set associated with a cell i. For simplicity of exposition herein, the term "$\bar{q}_{0,i}$," may be used herein in connection the terms "BFD-RS set(s)" and/or "set(s) of BFD RSs" to refer to the BFD-RS set(s) corresponding to the RS-indexes sets $\bar{q}_{0,i}$.

In various embodiments, the WTRU may be configured with a first BFD-RS set (e.g., $\bar{q}_{0,1}$) and a second BFD-RS set (e.g., $\bar{q}_{0,2}$) to support two cells that may be configured for any of single cell and multiple cell modes of operation. The first BFD-RS set (e.g., $\bar{q}_{0,1}$) may be associated with a serving cell. The second BFD-RS set (e.g., $\bar{q}_{0,2}$) may be associated with a non-serving cell. The non-serving cell may coordinate with the serving cell (and/or vice versa) for the multi-cell mode of operation.

In various embodiments, a configuration associated with a BFD-RS set may include a PCID of the cell associated with the BFD-RS set if the BFD-RS set is associated with a non-serving cell. In various embodiments, a configuration associated with a BFD-RS set need not include a PCID of the cell associated with the BFD-RS set and/or no PCID of the cell associated with the BFD-RS set may be configured if the BFD-RS set is associated with a serving cell. In various embodiments, each configuration associated with a BFD-RS set may include a PCID of the cell associated with such BFD-RS set (e.g., whether or not the cell is a serving cell or a non-serving cell).

A WTRU may receive information for configuring a BFR configuration via signaling (e.g., any of L1, L2, L3 and other layer signaling). The information may specify/indicate some or the entire BFR configuration explicitly ("explicit BFR-configuration information"). The information may indicate some or the entire BFR configuration referentially. For example, the information might not specify/indicate some or the entire BFR configuration explicitly and may include other information (e.g., information for one or more other configurations) and an indication to invoke the WTRU to determine (e.g., process one or more (pre)configured rules for determining) some or the entire BFR configuration based on and/or using the other information. Alternatively, the information might not specify/indicate some or the entire BFR configuration explicitly and may include other information (e.g., information for one or more other configurations). The WTRU may determine (e.g., process one or more (pre)configured rules for determining) some or the entire BFR configuration based on and/or using the other information. As an example, the WTRU might not receive explicit configuration information for one or more BFD-RS sets (e.g., due to signaling of explicit BFD configuration not being supported) and may receive information for configuring one or more TCI states for PDCCH reception. The WTRU may configure the BFD-RS sets based on or using one or more RSs of the (configured) TCI states having QCL Type-D configuration.

Indication of TCI states may be done jointly for uplink and downlink transmissions. To facilitate joint indication of TCI states ("joint TCI state indication"), a WTRU is configured with one or more RSs for both uplink and downlink. The WTRU may determine spatial filtering required for transmission or reception of a signal, i.e., uplink and downlink, based on the respective RSs.

In various embodiments, the WTRU may determine one or more BFD-RS sets based on or using RSs (e.g., one or more RSs of one or more TCI states) that are associated to one or more CORESET groups. For example, the WTRU may determine one or more RSs in one or more TCI states associated to a first CORESET group (of the CORESET groups) as a first BFD-RS set, one or more RSs in one or more TCI states associated to a second CORESET group (of the CORESET groups) as a second BFD-RS set, and so on.

The WTRU may determine the CORESET groups based on any of an explicit CORESET group configuration, an explicit CORESET grouping indication (e.g., signaling, such as MAC CE and/or DCI), an implicit CORESET group configuration and an implicit CORESET grouping indication (collectively "CORESET group configuration/indication").

In various embodiments, the WTRU may determine one or more BFD-RS sets based on or using RSs (e.g., one or more RSs of one or more TCI states) that are associated to one or more search space groups. For example, the WTRU may configure one or more RSs in one or more TCI states associated to a first search space group (of the search space groups) as a first BFD-RS set, one or more RSs in one or more TCI states associated to a second search space group (of the search space groups) as a second BFD-RS set, and so on.

The WTRU may determine the search space groups based on any of an explicit search space group configuration, an explicit search space grouping indication (e.g., signaling, such as MAC CE and/or DCI), an implicit search space group configuration and an implicit search space grouping indication (collectively "search space group configuration/indication").

The CORESET configuration/indication and/or the search space group configuration/indication (collectively "CORESET/search space group configuration/indication") may be based on one or more of following:

Explicit configuration/indication:
  CORESET/search space group ID:
    The WTRU may be configured with one or more CORESETs with CORESET group ID. Based on the group ID, the WTRU may determine a CORESET group for the one or more CORESETs. For example, if the WTRU is configured with a first CORESET with a first CORESET group ID and a second CORESET with a second CORESET group ID, then the WTRU may determine the first CORESET as the first CORESET group and the second CORESET as the second CORESET group.
    The WTRU may receive and/or be configured with a group ID in a TCI state configuration in lieu of or in addition to a CORESET configuration.
Implicit configuration/indication:
  CORESET/search space type:
    A CORESET type may be determined based on at least one of following:
      How the beam is indicated for a CORESET (e.g., RRC, MAC-CE, and DCI). For example, if the beam for a CORESET (e.g., a TCI state associated with a CORESET) is indicated from MAC-CE, the CORESET may be determined as a first CORESET type. If the beam for a CORESET (e.g., a TCI state associated with a CORESET) is indicated from a DCI, then the CORESET may be determined as a second CORESET type. In various embodiments the beam for a CORESET may be referred to as a beam that may be used for monitoring of one or more search spaces associated with the CORESET.
      How to use or configure a CORESET (e.g., joint TCI state indication or PDSCH/PUSCH scheduling). For example, if a CORESET is used for a joint TCI state indication, the CORESET may be determined as a first CORESET type. If a CORESET is used for a PDSCH/PUSCH scheduling, the CORESET may be determined as a second CORESET type.
      How a CORESET is monitored (e.g., a group-common DCI or dedicated DCI). For example, if one or more search spaces associated with a CORESET is monitored for a first type of DCI (e.g., group-common DCI), the CORESET may be determined as first CORESET type. If one or more search spaces associated with a CORESET is monitored for a second type of DCI (e.g., scheduling of PDSCH/PUSCH), the CORESET may be determined as second CORESET type.
    The WTRU may be configured with one or more CORESETs having one or more CORESET types. Based on the CORESET type, the WTRU may determine a CORESET group. For example, if the WTRU is configured with a first CORESET with a first CORESET type (e.g., joint TCI state indication), the WTRU may determine the first CORESET as a first CORESET group. If the WTRU is configured with a second CORESET with a second CORESET type (e.g., PDSCH/PUSCH scheduling), the WTRU may determine the second CORESET as a second CORESET group.
  ID configuration (e.g., CORESET/search space ID and/or TCI state ID):
    The WTRU may determine the CORESET group based on an ID. For example, if an associated ID of a first CORESET is smaller than (or equal to) a threshold, the WTRU may determine the first CORESET as a first CORESET group. If the associated ID of the first CORESET is larger than the threshold, the WTRU may determine the first CORESET as a second CORESET group.

In various embodiments, a WTRU may determine and/or may be configured with a plurality of CORESET/search space groups. Each of the CORESET/search space groups may correspond to one or more of a plurality of BFR modes of operation.

In various embodiments, the plurality of BFR modes of operation include first and second BFR modes of operation. The first BFR mode of operation may correspond to a CORESET/search space group for which a joint TCI state indication may be received. The second BFR mode of operation may correspond to a CORESET/search space group for which separate (e.g., individual UL or DL) TCI indication may be received.

Each of the plurality of BFR modes may correspond to a plurality of CORESET/search space group configurations.

In various embodiments, a WTRU may determine one or more of BFD-RS sets based on determination of the mode of operation.

Modes of operation may be defined based on deployment scenarios, network traffic, and other performance consideration. For example, a joint indication mechanism may be preferred in a high-speed train scenario, as spatial information about both uplink and downlink may need to be updated frequently, in contrast to a regular cell where simultaneous updating of spatial information of both uplink and downlink may not be always needed.

In various embodiments, if a TCI state comprises multiple RSs having QCL Type-D configurations (e.g., for multi-PDCCH transmission), the WTRU may determine one or more BFD-RS sets based on one or more of following:

The WTRU may set the multiple RSs of the TCI state as RSs of BFD-RS sets. The WTRU may determine the BFD-RS set based on associations between TCI states and cells (e.g., based on cell ID(s) in the TCI states). For example, the WTRU may set a first RS of the TCI state as a first BFD-RS set based on the first RS including (and/or being associated with) a first cell ID or no cell ID. The WTRU may set a second RS of the TCI state as a second BFD-RS set based on the second RS including (and/or being associated with) a second cell ID. The WTRU may support monitoring a group of RSs (e.g., the first and second BFD-RS sets) when the WTRU supports setting the multiple RSs of the TCI state as RSs of multiple BFD-RS sets.

In various embodiments, if PDCCH transmission utilizes multiple TCI states for QCL Type-D (e.g., for multi-PDCCH transmission), the WTRU may determine the BFD-RS sets based on one or more of following:

The WTRU may set RSs of the multiple TCI states as RSs of one or more BFD-RS sets.

The WTRU may determine the BFD-RS sets based on associations between TCI states and cells (e.g., based on cell IDs in the TCI states). For example, the WTRU may set a first (e.g., the only) RS of a first TCI state as a first BFD-RS set based on the first TCI state including (and/or being associated with) a first cell ID or no cell ID. The WTRU may set a second (e.g., the only) RS of a second TCI state as a second BFD-RS set based on the second TCI state including (and/or being associated with) a second cell ID. The WTRU may support monitoring a group of RSs (e.g., the first and second BFD-RS sets) when the WTRU supports setting RSs of multiple TCI states as RSs of multiple BFD-RS sets.

Group based monitoring may be based on one or more of following:

The WTRU may measure qualities of the multiple RSs as a group. The measurement may be based on one or more of following:

any of an average hypothetical BLER of the multiple RSs, an average L1-RSRP of the multiple RSs, and average of L1-SINR of the multiple RSs;

any of a minimum hypothetical BLER of the multiple RSs, a minimum L1-RSRP of the multiple RSs, and a minimum L1-SINR of the multiple RSs;

any of a maximum hypothetical BLER of the multiple RSs, a maximum L1-RSRP of the multiple RSs, and a maximum L1-SINR of the multiple RSs;

any of a hypothetical BLER, a L1-RSRP, and a L1-SINR assuming multiple PDCCH combining based on the multiple RSs;

a number of RSs of the multiple RSs having an acceptable quality satisfying a threshold (e.g., the WTRU may report beam failure if the number of RSs having an acceptable quality is less than (or equal to) the threshold and might not determine and/or report beam failure if the number of RSs having an acceptable quality greater than (or equal to) the threshold; and a number of RSs of the multiple RSs having an unacceptable quality satisfying a threshold (e.g., the WTRU may report beam failure if the number of RSs having an unacceptable quality is greater than (or equal to) the threshold and might not report beam failure if the number of RSs having an unacceptable quality is less than (or equal to) the threshold.

A WTRU may be configured with one or more sets of RSs associated with new candidate beams (NCB RSs) (each an "NCB-RS set"). For example, the WTRU may be configured with one or more RS-indexes sets $\bar{q}_{1,i}$ corresponding to the one or more NCB-RS sets. Each RS-indexes set $\bar{q}_{1,i}$ may correspond to the NCB-RS set associated with a cell i. For simplicity of exposition herein, the term "$\bar{q}_{1,i}$" may be used herein in connection the terms "NCB-RS set(s)" and/or "set(s) of NCB RSs" to refer the NCB-RS set(s) corresponding to the RS-indexes sets $\bar{q}_{1,i}$. In various embodiments, each NCB RS in an NCB-RS set may be associated with one or more uplink resources (e.g., any of PRACH, PUCCH, PUSCH, and/or SRS).

In various embodiments, a configuration of (or associated with) $\bar{q}_{1,i}$ may include a PCID of the cell associated with such $\bar{q}_{1,i}$ if the $\bar{q}_{1,i}$ is associated with a non-serving cell (e.g., i≠0). In various embodiments, a configuration of (or associated with) $\bar{q}_{1,i}$ need not include a PCID of the cell associated with the BFD-RS set and/or no PCID of the cell associated with $\bar{q}_{1,i}$ set may be configured if $\bar{q}_{1,i}$ is associated with a serving cell (e.g., i=0). In various embodiments, each configuration associated with a $\bar{q}_{1,i}$ may include a PCID of the cell associated with such $\bar{q}_{1,i}$ (e.g., whether or not the cell is a serving cell or a non-serving cell).

A WTRU may be configured with one or more sets of uplink resources (each a "UL-resource set") for new candidate beam indication. For example, the WTRU may be configured with one or more UL-resource sets $S_i$, and each UL-resource set $S_i$ may indicate UL resources to use for indicating (reporting) a new candidate beam for the cell i.

A WTRU may be configured with one or more sets of search spaces (each a "search-space set") for receiving one or more confirmation random access response of BFR. For example, the WTRU may be configured with one or more search-spaces sets $C_i$, and each search-spaces sets $C_i$ may indicate search spaces to receive random access response for BFR of the cell i. One or more of CORESETs may be used as an alternative to (e.g., in lieu of) one or more of the search-space sets.

In multi-cell scenario, a WTRU may determine one or more new candidate beams ($q_{new,i}$) and each new candidate beam may be associated with a different cell, wherein $q_{new,i}$ is determined new candidate beam (or beam index) for the cell i. For example, a first new candidate beam ($q_{new,1}$) may be selected from the new candidate beam RS set associated with the first cell ($\bar{q}_{1,1}$) and a second new candidate beam ($q_{new,2}$) may be selected from the new candidate beam RS set associated with the second cell ($\bar{q}_{1,2}$).

One or more of modes of operation may be used for beam failure recovery request. The number of sets for at least one of BFD-RS set, NCB-RS set, and UL resource set may be determined based on the mode of operation. One or more of following may apply:

A mode of operation may be determined based on one or more numbers of sets. The numbers of sets may comprise at least one of the number of BFD-RS sets, the number of NCB-RS sets, the number of UL resource sets and the number of search space sets associated with the BFR procedure.

A mode of operation may be determined based on the number of PCIDs associated with the BFR procedure. For example, if two PCIDs (e.g., one for serving cell and another for non-serving cell) are configured for at least one of BFD-RS set, NCB-RS set, UL resource set and search space set, the WTRU may consider such condition as an indication of a first mode of operation (e.g., multi-cell BFR). If a single PCID or no PCID is configured, the WTRU may consider such condition as an indication of a second mode of operation (e.g., single-cell BFR). As another example, the mode of operation may be determined based on whether CORESET is configured with higher layer index (e.g., CORESET-PoolId) or not.

A mode of operation may be determined based on a capability of a WTRU ("WTRU capability") and a configuration of a base station based on the WTRU capability (reported to the base station).

A mode of operation may be determined based on the number of PCIDs associated with TCI states associated with a BFR set, a BFD-RS set, an NCB-RS set and/or an UL resource set. For example, if TCI states associated with at least one of BFD-RS set, NCB-RS set, UL resource set and CORESETs associated with search space set includes two PCIDs (e.g., one for serving cell and another for non-serving cell), the WTRU may consider such condition as an indication of a first mode of operation (e.g., multi-cell BFR). If each TCI state associated with a BFD-RS set, an NCB-RS set, an UL resource set and one or more CORESETs associated with search space set includes at most one PCID (i.e., a single PCID or no PCID), the WTRU may consider such condition as an indication of a second mode of operation (e.g., single-cell BFR). As another example, if TCI states associated with at least one of a BFD-RS set, an NCB-RS set, an UL resource set and one or more CORESETs associated with search space set includes TRS resource sets associated with two PCIDs, the WTRU may consider such condition as an indication of a first mode of operation (e.g., multi-cell BFR). If each TCI states associated with a BFD-RS set, an NCB-RS set, an UL resource set and one or more CORESETs associated with search space set includes TRS resource sets associated with at most one PCID, the WTRU may consider such condition as an indication of a second mode of operation (e.g., single-cell BFR). As used herein, PCIDs associated with TCI states associated with (e.g., used in connection with) a BFR set, a BFD-RS set, an NCB-RS set, an UL resource set and/or a search space set may be referred as associated PCIDs (e.g., explicit indication of configured PCIDs).

A WTRU may request its preferred mode of operation for BFR. For example, if a WTRU is capable of supporting both single-cell BFR and multi-cell BFR modes of operation and the measurements at a WTRU indicates a preferred mode of operation, the WTRU may transmit to a base station information indicating the preferred mode of operation. If beam quality measurements of one or more beams from different cells are less than (or higher than) a threshold, a WTRU may indicate a first mode of operation as a preferred mode of operation. For example, if beam quality measurement values of each of a best beam of a serving cell and a best beam of non-serving cell are less than (or equal to) a threshold of X dBs, the WTRU may determine (set) the first mode of operation as preferred mode of operation and/or may indicate to the base station that the first mode of operation is the preferred mode of operation. Otherwise, the WTRU may determine (set) the second mode of operation as preferred mode of operation and/or may indicate to the base station that the second mode of operation is the preferred mode of operation.

In various embodiments, a WTRU may be configured one or more additional configurations for each RS/resource of sets. The one or more additional configurations may be at least one of a periodicity of the RS/resource; a timing offset between a first RS/resource set (e.g., higher priority) and a second RS/resource set (e.g., lower priority); a frequency offset between a first RS/resource set (e.g., higher priority) and a second RS/resource set (e.g., lower priority); a frequency of the RS/resource; monitoring duration of the RS/resource; and subcarrier spacing of the RS/resource.

In various embodiments, a WTRU may be configured with one or more of BFD-RS sets ($\bar{q}_{0,i}$), NCB-RS sets ($\bar{q}_{1,i}$), UL resource sets ($S_i$), and/or search space sets ($C_i$). A BFR set may include at least one of BFD-RS sets, NCB-RS sets, UL resource sets and search space sets. In an embodiment, a BFR set may include one or more BFD-RS sets, one or more NCB-RS sets, zero or more UL resource sets and zero or more search space sets. As another example, a BFR set may be expressed as $R_{set,i} = \{\bar{q}_{0,i}, \bar{q}_{1,i}, S_i, C_i\}$, wherein such BFR set may be associated with a cell or PCID.

For beam failure recovery, a WTRU may determine a BFR set within one or more BFR sets. The BFR set may be determined based on any of the following:

A best beam quality of BFR set. For example, the quality of best beams in each BFR set and determine the BFR set which may have the highest quality of best beams. The best beam may be interchangeably used with determined beam, selected beam, or used beam. A best beam from $R_{set,i}$ may be referred to as $q_{new,i}$. If there are three cells, i=1, 2, 3, the BFR set may be determined based on $q_{new,i}$ with the highest beam quality (e.g., L1-RSRP or radio link quality).

A lowest PCID. For example, BFR set associated with a lowest PCID may be determined or selected.

A serving cell. For example, BFR set associated with a serving cell may be determined or selected.

In various embodiments, the WTRU may determine one or more BFR sets based on or using RSs (e.g., one or more RSs of one or more TCI states) that are associated to one or more CORESET groups. For example, the WTRU may determine one or more RSs in one or more TCI states associated to a first CORESET group (of the CORESET groups) as a first BFD-RS set of a first BFR set, one or more RSs in one or more TCI states associated to a second CORESET group (of the CORESET groups) as a second BFD-RS set of a second BFR set, and so on. The WTRU may determine the CORESET groups based on a CORESET group configuration/indication.

In various embodiments, the WTRU may determine one or more BFR sets based on or using RSs (e.g., one or more RSs of one or more TCI states) that are associated to one or more search space groups. For example, the WTRU may determine one or more RSs in one or more TCI states associated to a first search space group (of the search space groups) as a first BFD-RS set of a first BFR set, one or more RSs in one or more TCI states associated to a second search space group (of the search space groups) as a second BFD-RS set of a second BFR set, and so on. The WTRU may determine the search space groups based on a search space group configuration/indication.

The CORESET/search space group configuration/indication may be based on one or more of following:

Explicit configuration/indication:
CORESET/search space group ID:
The WTRU may be configured with one or more CORESETs with CORESET group ID. Based on the CORESET group ID, the WTRU may determine a CORESET group for the one or more CORESETs. For example, if the WTRU is configured with a first CORESET with a first CORESET group ID and a second CORESET with a second CORESET group ID, then the WTRU may determine the first CORESET as the first CORESET group and the second CORESET as the second CORESET group.

The WTRU may receive and/or be configured with a group ID in a TCI state configuration in lieu of or in addition to a CORESET configuration.

Implicit configuration/indication:
CORESET/search space type:
A CORESET type may be determined based on at least one of following:
How the beam is indicated for a CORESET (e.g., RRC, MAC-CE, and DCI). For example, if the beam (e.g., TCI state) for a CORESET is indicated from MAC-CE, the CORESET may be determined as a first CORESET type. If the beam (e.g., TCI state) for a CORESET is indicated from a DCI, the CORESET may be determined as a second CORESET type. In various embodiments, the beam for a CORESET may be referred to as a beam that may be used for monitoring of one or more search spaces associated with the CORESET.

How to use or configure a CORESET (e.g., joint TCI state indication or PDSCH/PUSCH scheduling). For example, if a CORESET is used for a joint TCI state indication, the CORESET may be determined as a first CORESET type. If a CORESET is used for a PDSCH/PUSCH scheduling, the CORESET may be determined as a second CORESET type.

How a CORESET is monitored (e.g., a group-common DCI or dedicated DCI). For example, if one or more search spaces associated with a CORESET is monitored for a first type of DCI (e.g., group-common DCI), the CORESET may be determined as first CORESET type. If one or more search spaces associated with a CORESET is monitored for a second type of DCI (e.g., scheduling of PDSCH/PUSCH), the CORESET may be determined as second CORESET type.

The WTRU may be configured with one or more CORESETs; each with a CORESET type. Based on the CORESET type, the UE may determine a CORESET group.

For example, if the WTRU is configured with a first CORESET with a first CORESET type (e.g., joint TCI state indication), the WTRU may determine the first CORESET as a first CORESET group. If the WTRU is configured with a second CORESET with a second CORESET type (e.g., PDSCH/PUSCH scheduling), the WTRU may determine the second CORESET as a second CORESET group.

ID configuration (e.g., CORESET/search space ID and/or TCI state ID):
The WTRU may determine the CORESET group based on a ID. For example, if an associated ID of a first CORESET is smaller than (or equal to) a threshold, the WTRU may determine the first CORESET as a first CORESET group. If the associated ID of the first CORESET is larger than (or equal to) the threshold, the WTRU may determine the first CORESET as a second CORESET group.

In various embodiments, a WTRU may determine and/or may be configured with a plurality of CORESET/search space groups. Each of the CORESET/search space groups may correspond to one or more of a plurality of BFR modes of operation.

In various embodiments, the plurality of BFR modes of operation include first and second BFR modes of operation. The first BFR mode of operation may correspond to a CORESET/search space group for which a joint TCI state indication may be received. The second BFR mode of operation may correspond to a CORESET/search space group for which separate (e.g., individual UL or DL) TCI indication may be received.

Each of the plurality of BFR modes may correspond to a plurality of CORESET/search space group configurations.

In various embodiments, a WTRU may determine one or more of BFR sets based on determination of the mode of operation.

Modes of operation may be defined based on deployment scenarios, network traffic, and other performance consideration. For example, a joint indication mechanism may be preferred in a high speed train scenario, as spatial information about both uplink and downlink may need to be updated frequently, in contrast to a regular cell where simultaneous updating of spatial information of both uplink and downlink may not be always needed.

Herein, CORESET type may be interchangeably used with CORESET group type, search space type, search space group type, SS type, SS group type, and BFR set type.

In various embodiments, a prioritization among BFR sets may be used. For example, a WTRU may first determine or use a first BFR set (e.g., higher priority) and if the WTRU may not successfully recover the beam failure with the first BFR set, the WTRU may determine or use a second BFR set (e.g., lower priority). As another example, each BFR set may be indexed with a priority level and the WTRU may determine or use a BFR set based on the priority level index (e.g., from high to low, or vice versa). Herein, the priority level of BFR set may be interchangeably used with BFR set order and BFR set sequence. One or more of following may apply:

A priority level of BFR set may be determined based on at least one of following:
a BFR set index.
whether the BFR set is associated with a serving cell or a non-serving cell. A BFR set associated with a serving cell may have a higher priority than a BFR set associated with a non-serving cell.
a PCID associated with the BFR set. For example, a BFR set with a low(er) PCID number may have a higher priority or a higher priority level.
a number of new candidate beams in the BFR set. For example, a BFR set with a larger number of new candidate beams may have a higher priority than a BFR set with a smaller number of new candidate beams.

whether the BFR set is configured with a PCID. For example, a BFR set without a PCID in the configuration may have a higher priority than a BFR set with PCID in the configuration.

The WTRU may lower the priority of a BFR set to the lowest priority based on a specific panel of the WTRU associated with such BFR set detecting any of a (e.g., potential) MPE issue and a (e.g., potential) SAR issue (e.g., detecting that one or more proximity sensors of the WTRU indicate the WTRU is sufficiently proximate to a human body to trigger a MPE and/or a SAR issue) For example, the WTRU may determine to lower the priority of the BFR set to the lowest priority based on a WTRU report of P-MPR associated with a BFR set (e.g., P-MPR reporting on an RS resource/a panel associated with the first BFR set). The WTRU, for example, may lower the priority of the BFR set if the WTRU reports a P-MPR satisfies (e.g., is greater than or equal to) a threshold for the BFR set. One or more thresholds for priority determination may be predefined in and/or indicated/signaled to the WTRU from a base station or other network element (e.g., via one or more of RRC, MAC CE and DCI).

The WTRU may adjust the priority of a BFR set to a previously-assigned or other priority based on a specific WTRU panel associated with the BFR set detecting deactivation of any of a (e.g., potential) MPE issue and a (e.g., potential) SAR issue (e.g., detecting that one or more proximity sensors of the WTRU indicate the WTRU is not sufficiently proximate to a human body to trigger a MPE and/or a SAR issue). For example, if the specific WTRU panel detects an MPE issue and/or a SAR issue is no longer active (e.g., based on the WTRU reporting a P-MPR that satisfies (e.g., is less than and/or equal to) a threshold, the priority of the BFR set associated with the WTRU specific panel may be returned to a previous assigned priority index or set to a maximum priority (e.g., to restore new beams as fast as possible). One or more thresholds for priority determination may be predefined in and/or signaled/indicated to the WTRU from a base station or other network element (e.g., via one or more of RRC, MAC CE and DCI).

A WTRU may determine a BFR set to use for a BFR operation based, at least in part, on priority levels of one or more BFR sets. As an example, the WTRU may be configured with a plurality of BFR sets and the WTRU may determine the priority level for each of the BFR sets. Based on the determined priorities (and/or configuration), the WTRU may determine to use the BFR set assigned the highest priority level and may ignore all of the other BFR sets. The WTRU, for example, need not monitor, not select a new candidate beam for, not report the selected beams for, not monitor BFR-CORESETs for, and/or otherwise ignore each the other BFR sets.

A WTRU may switch from a BFR set to another BFR set (e.g., from higher priority BFR set to lower priority BFR set) based on one or more of following:

One or more timers may be used (e.g., BFRsetTimer).
A first BFR set (e.g., priority level-1) may be used for a BFR operation while time remains on the timer. After expiration of the timer, a second BFR set may be used.
A first BFR set (e.g., priority level-1) may be used for a BFR operation while time remains on a first timer is running. After expiration of the first timer, a second BFR set may be used while time remains on a second timer. When the second timer is expired, contention-based RACH procedure may initiate.
The one or more timers may expire if a WTRU cannot successfully recover the beam failure within the time window.
The one or more timers may reset if a WTRU receives a DCI with C-RNTI or MCS-C-RNTI in the recoverySearchSpaceId which is configured for beam failure recovery. In other words, the WTRU may not reset if the WTRU doesn't receive a DCI with C-RNTI or MCS-C-RNTI in the recoverySearchSpaceId.

One or more counters may be used (e.g., BFRsetCounter).
A threshold may be used (e.g., maxBFRsetCounter). If the number of BFR trials is equal to or larger than maxBFRsetCounter, a WTRU may switch from a first BFR set to a second BFR set.
A first threshold may be used (e.g., maxBFRsetCounter). If the number of BFR trials based on a first BFR set is equal to or larger than a first counter, a WTRU may switch from a first BFR set to a second BFR set. A second threshold may be used for BFR trial based on a second BFR set. If the number of BFR trials based on the second BFR set is equal to or larger than a second counter, a WTRU may initiate contention-based RACH procedure.
A BFR trial may be that a WTRU sends a new candidate beam indication and fails to receive its response (e.g., DCI with C-RNTI in recoverySearchSpaceId) within a time window, wherein the time window may be RAR window or a window configured for beam failure recovery response.
A combination of timer and counter may be used. For example, if a timer is expired, a second BFR set may be used. If the timer is expired and the counter is equal to or larger than the maxBFRsetCounter, a third BFR set may be used.
A best beam (e.g., new candidate beam) quality. For example, if the quality of the best beam in a first BFR set is lower than a threshold, the WTRU may start using or determine a second BFR set until the WTRU finds the best beam quality is higher than a threshold.

base station configuration or indication.
expiry of a MPE prohibit timer.
expiry of a SAR prohibit timer.
an MPE activation timer.
a SAR activation timer.
a PHR and/or a MAC CE indicating (e.g., signaling an indication of) MPE activation, an indication of SAR activation, and/or a periodic transmission. For example, a WTRU may determine to use and/or start using an alternative ("the second") BFR set based on the WTRU reporting a P-MPR associated with a first BFR set (e.g., based on an RS resource of the first BFR set), where the P-MPR associated with the first BFR set is larger than a P-MPR associated with the second BFR set.

In various embodiments, one or more BFR sets may be used and each BFR set may be associated with a different cell (or PCID) and a WTRU may perform a BFR procedure independently for each BFR set. Herein, the BFR procedure includes but not limited to beam failure detection, new candidate beam determination and indication, receive confirmation from base station for the new candidate beam, and reconfiguration of beam for the CORESET(s). In this case, one or more of following may apply:

Collision handling in time domain.
- if there is an overlap or conflict in time between BFD-RSs from different BFR sets, a WTRU may determine to receive/measure BFD-RS from the BFR set with a higher priority, lower PCID index, serving cell, and/or better beam quality of determined new candidate beam.
- If there is an overlap or conflict in time between UL resources for new candidate beam indication, a WTRU may determine to transmit a new candidate beam from the BFR set with a higher priority, lower PCID index, serving cell, and/or better beam quality of determined new candidate beam.

Beam recovery through serving cell(s).
- A first BFR set may be associated with a serving cell and it may include BFD-RS set, NCB-RS set, UL resource set and search space set (i.e., $R_{set,i} = \{\bar{q}_{0,i}, \bar{q}_{1,i}, S_i, C_i\}$) while a second BFR set may be associated with a non-serving cell and it may include BFD-RS set and NCB-RS set only.
  - In an example, the UL resource set in the first BFR set may be commonly used for new candidate beam indication of any BFR set.
  - As another example, the UL resource set in the first BFR set may be only used for new candidate beam indication in the first BFR set. Another uplink resource (e.g., PUSCH or PUCCH) which may not be dedicated to BFR may be used for new candidate beam indication for other BFR sets.
- A UL resource set and/or a search space set may be commonly used for all BFR sets and each BFR set may include a BFD-RS set and a NCB-RS set only.
- When a WTRU sends a signal using a UL resource for new candidate beam indication, the signal may include an associated BFR set index implicitly or explicitly.
  - For example, if PRACH is used as a UL resource, a PRACH sequence index (e.g., base sequence, cyclic shift) may be determined based on BFR set associated therewith.
- When a WTRU receives a PDCCH transmission using a search space for a BFR random access response, the signal may include an associated BFR set index implicitly or explicitly.
  - For example, a DCI field may indicate the associated BFR set index.
- A MAC CE indicating (e.g., signaling an indication of) an MPE activation and/or a SAR activation may include (e.g., in an extension) an indication of the associated BFR set index that is affected and/or a new BFR set to be used as an alternative in connection with a MPE/SAR issue encountered by the WTRU. A base station or other network element may be updated with a related DL TCI state or an UL TCI state that may contain an SRI part that may be associated to a new updated WTRU panel.

Different BFR configurations for each BFR set.
- Different numbers of failed beams may be used.
  - For example, a WTRU may determine a beam failure of a first BFR set if, for example, a first number (e.g., 6 BFD-RSs) of BFD-RSs in the first BFR set fails. The WTRU may determine a beam failure of a second BFR set if, for example, a second number (e.g., all BFD-RSs) of BFD-RSs in the second BFR set fails.
- Different timers may be used (e.g., one or more of a BFD timer and a BFR timer).
  - For example, a first BFR set may use a first timer for beam failure detection and a second BFR set may use a second timer for beam failure detection.
  - For example, a first BFR set may use a first timer for new beam selection and a second BFR set may use a second timer for new beam selection.
  - For example, a first BFR set may use a first timer for beam failure recovery operation and a second BFR set may use a second timer for beam failure recovery operation.
    - If any of the first and second timers expire, the WTRU may initiate a contention-based RACH procedure.
  - A configuration of the second timer may be based on a configuration of the first timer (e.g., delta value, ratio and etc.).
- Different counters may be used
  - For example, a first BFR set may use a first counter for beam failure detection and a second BFR set may use a second counter for beam failure detection.
  - For example, a first BFR set may use a first counter for new beam reporting and a second BFR set may use a second counter for new beam reporting.
  - For example, a first BFR set may use a first counter for power ramping and a second BFR set may use a second counter for power ramping.
  - A configuration of the second timer may be based on a configuration of the first timer (e.g., delta value, ratio and etc.).
- Different MPE or SAR prohibit timers may be used.
- Different MPE or SAR activation timers may be used.
- A combination of different timers and different counters may be used.

In various embodiments, a BFR operation may be performed jointly with at least one of one or more BFD-RS sets, NCB-RS sets, UL resource sets and search space sets.

For joint BFR operation, a WTRU may be configured with a plurality of BFD-RS sets for multiple cells. In various embodiments, a prioritization among the plurality of BFD-RS sets may be used. For example, the WTRU may determine or use a first BFD-RS set (e.g., higher priority) and if the first BFD-RS set fails (e.g., quality of the first BFD-RS set is lower than a threshold), the WTRU may determine or use a second BFD-RS set (e.g., lower priority). As another example, each BFD-RS set may be indexed with priority level and the WTRU may determine or use BFD-RS set based on the priority level index (e.g., from high to low, or vice versa). Herein, the priority level of a BFD-RS set may be interchangeably used with BFD-RS set order and BFD-RS set sequence. One or more of following may apply:
- A priority level of a BFD-RS set may be determined based on at least one of following:
- CORESET/search space group type. For example, if a first BFD-RS set is based on a first type (e.g., joint TCI state indication) of one or more CORESETs and a second BFD-RS set is based on a second type (e.g., PDCCH reception of PUSCH/PDSCH scheduling) of one or more CORESETs, the WTRU may determine that the priority level of the first BFD-RS set is the highest priority level and/or that it is higher than the priority level of the second BFD-RS set.
- a BFD-RS set index.
- whether BFD-RS set is associated with serving cell or non-serving cell. The BFD-RS set associated with serving cell may have a higher priority than that associated with non-serving cell.

a PCID associated with BFD-RS set. For example, BFD-RS set with lower PCID number may be a higher priority or has higher priority level.

a number of monitoring beams in BFD-RS set. For example, a BFD-RS set with a larger number of monitoring beams may be a higher priority than that with a smaller number of monitoring beams.

whether the BFD-RS set is associated/configured with a PCID. For example, a BFD-RS set without a PCID in the configuration may have a higher priority than a BFD-RS set with a PCID in the configuration.

Detection of a (e.g., potential) MPE issue and/or a (e.g., potential) SAR issue by a WTRU panel associated with the BFR set (e.g., detection of MPE and/or SAR issues triggered in connection with one or more proximity sensors of the WTRU indicating the WTRU is sufficiently proximate to a human body to trigger the MPE and/or SAR issues).

Detection of a deactivation of any of a (e.g., potential) MPE issue and a (e.g., potential) SAR issue by a WTRU panel associated with the BFR set (e.g., detection of MPE and/or SAR issues triggered in connection with one or more proximity sensors of the WTRU indicating the WTRU is not sufficiently proximate to a human body to trigger the MPE and/or SAR issues).

a PHR and/or a MAC CE indicating (e.g., signaling an indication of) MPE activation, an indication of SAR activation, and/or a periodic transmission. For example, WTRU may adjust (e.g., lower) a priority of the BFD-RS set based on the WTRU reporting a P-MPR associated with the BFR set (e.g., based on an RS resource of the BFR set), where the P-MPR associated with a BFR set is larger than a P-MPR associated with a another BFR set.

a metric based on (e.g., a combination, function, etc. of) a P-MPR and at least one of a RSRP, a SINR, and a hypothetical BLER. For example, the WTRU may compare a measured RSRP with a required P-MPR for the BFD-RS set and may base the priority on that determination.

A WTRU may switch from one BFD-RS set ("first BFD-RS set") to another BFD-RS set ("second BFD-RS set") (e.g., from higher priority BFD-RS set to lower priority BFD-RS set) based on one or more of following:

A first BFD-RS set (e.g., priority level-1) may be used for beam failure detection until a WTRU detects beam failure based on the first BFD-RS set. When the WTRU detects the beam failure, a second BFD-RS set may be used until a WTRU detects beam failure based on the second BFD-RS set. When the WTRU detects the beam failure, the WTRU may report beam failure to a base station.

The WTRU may switch from a first BFD-RS set to a second BFD-RS set if the first BFD-RS set is affected by an MPE issue and/or a SAR issue. The second BFD-RS set may be associated with a WTRU panel different from the WTRU panel associated with the first BFD-RS set (e.g., a panel that is not facing the human body). A beam failure report for the first BFD-RS set may be sent (e.g., signaled) to the base station. The MPE issue and/or the SAR issue may be reported (e.g., signaled) to the base station (e.g., in beam failure report or separate from the beam failure report).

One or more counters may be used (e.g., BFD-RssetCounter and/or BFD-RS setCounter2)

A threshold may be used (e.g., maxBFD-RssetCounter). If the number of beam failure detections based on a first BFD-RS set and BFD-RssetCounter is equal to or larger than maxBFD-RssetCounter, a WTRU may switch from a first BFD-RS set to a second BFD-RS set.

A threshold may be used (e.g., maxBFD-RssetCounter). If the number of beam failure detections based on a first BFD-RS set and BFD-RssetCounter is equal to or larger than maxBFD-RssetCounter, a WTRU may switch from a first BFD-RS set to a second BFD-RS set. If the number of beam failure detections based on a second BFD-RS set and BFD-RssetCounter is equal to or larger than maxBFD-RssetCounter, the WTRU may determine one or more best beam based on one or more NCB-RS sets.

A threshold may be used (e.g., maxBFD-RssetCounter). If the number of beam failure detections based on a first BFD-RS set and BFD-RssetCounter is equal to or larger than maxBFD-RssetCounter, a WTRU may switch from a first BFD-RS set to a second BFD-RS set. If the number of beam failure detections based on a second BFD-RS set and BFD-RssetCounter2 is equal to or larger than maxBFD-RssetCounter, the WTRU may determine one or more best beam based on one or more NCB-RS sets.

A first threshold may be used (e.g., maxBFD-RssetCounter). If the number of beam failure detection based on the first BFD-RS set and BFD-RssetCounter is equal to or larger than maxBFD-RssetCounter, a WTRU may switch from a first BFD-RS set to a second BFD-RS set. If the number of beam failure detections based on a second BFD-RS set and BFD-RssetCounter2 is equal to or larger than maxBFD-RssetCounter2, the WTRU may determine one or more new candidate beams based on one or more NCB-RS sets.

A base station configuration or indication.

Figure 6A:
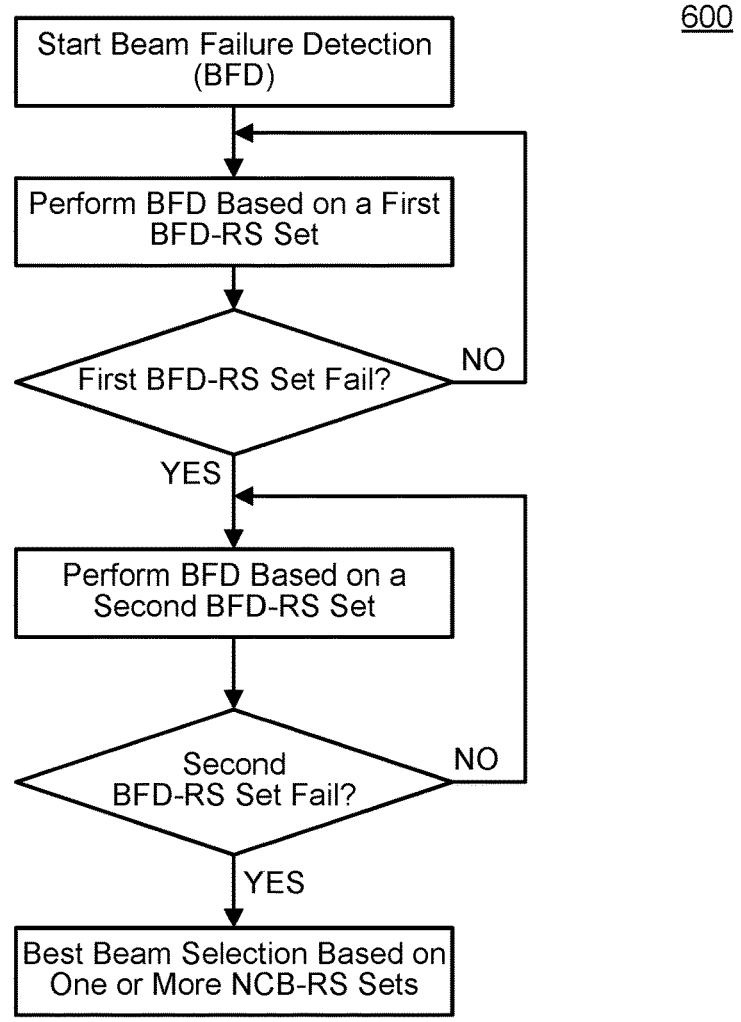
FIG. 6A illustrates an example beam failure detection (BFD) monitoring procedure.
Figure 6B:
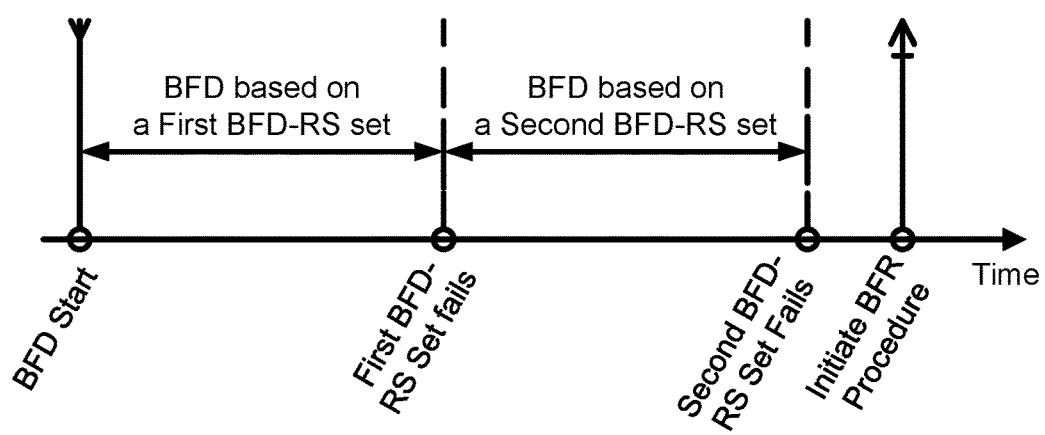
FIG. 6B illustrates an example beam failure detection (BFD) monitoring procedure.

FIG. 6A is a flow chart illustrating an example beam failure detection (BFD) monitoring procedure 600. FIG. 6B is a chart illustrating an example beam failure detection (BFD) monitoring procedure.

Figure 7A:
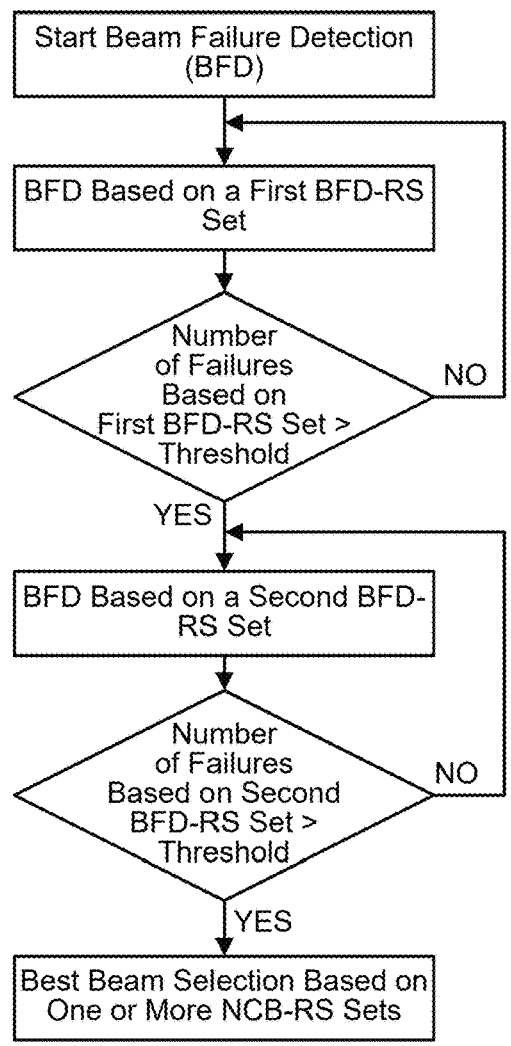
FIG. 7A illustrates an example beam failure detection (BFD) monitoring procedure.
Figure 7B:
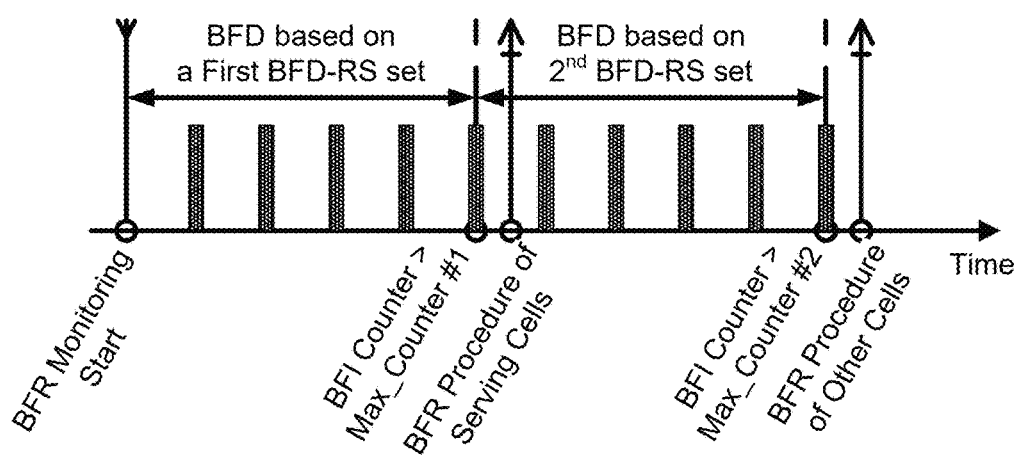
FIG. 7B illustrates an example beam failure detection (BFD) monitoring procedure.

FIG. 7A is a flow chart illustrating an example beam failure detection (BFD) monitoring procedure. FIG. 7B is a chart illustrating an example beam failure detection (BFD) monitoring procedure.

For joint BFR operation, a WTRU may be configured with one or more NCB-RS sets for multiple cells. Based on the one or more NCB-RS sets for multiple cells, the WTRU may determine one or more new candidate beams ($q_{new,i}$) and each new candidate beam may be associated with a different cell, wherein $q_{new,i}$ is determined new candidate beam (or beam index) for the cell i. For example, a first new candidate beam ($q_{new,1}$) may be selected from the new candidate beam RS set associated with the first cell ($\bar{q}_{1,1}$) and a second new candidate beam ($q_{new,2}$) may be selected from the new candidate beam RS set associated with the second cell ($\bar{q}_{1,2}$).

In various embodiments, WTRU determination among new candidate beams from one or more NCB-RS sets may be used. For example, the WTRU may select first one or more new candidate beams from a first NCB-RS set and second one or more new candidate beams from a second NCB-RS set. Based on the first one or more new candidate beams and the second one or more new candidate beams, the WTRU may determine one of the first one or more new candidate beams and the second one or more new candidate beams.

The determination may be based on at least one of following:

Quality of beams (e.g., RSRP, SINR, and/or PDCCH hypothetical BLER).

Biased quality of beams. For example, when the WTRU compares the quality of beams, an additional value (e.g., X dB) may be added to the quality of the first one or more new candidate beams. Based on the addition, the WTRU may compare the quality of the first one or more new candidate beams +X dB and the quality of the second one or more new candidate beams. When the quality of the first one or more new candidate beams +X dB is equal to or larger than the quality of the second one or more new candidate beams, the WTRU may report the first one or more new candidate beams to a base station. When the quality of the second one or more new candidate beams is larger than the quality of the first one or more new candidate beams +X dB, the WTRU may report the second one or more new candidate beams to the base station. The value X, may be predefined, configured in RRC configuration and/or reported by the WTRU (e.g., WTRU capability).

base station configuration or indication.

Quality of beams and P-MPR. For example, the WTRU may apply a bias based on one or more applied P-MPRs to a quality (or qualities) of one or more new candidate beams in connection with evaluating (e.g., comparing) the quality of the beams. For example, the WTRU may apply a first bias, X dB, to (e.g., subtract the first bias from) the quality/qualities of a first one or more new candidate beams and/or apply a second bias, Y dB, to (e.g., subtract the second bias from) the quality/qualities of a second one or more new candidate beams, where the values of the first bias, X dB, and the second bias, Y dB, are based on one or more P-MPRs (e.g., separate P-MPRs for different frequency ranges). The WTRU may evaluate (e.g., compare) the quality of the first one or more new candidate beams and the quality of the second one or more new candidate beams after applying the respective biases (e.g., compare the quality of the first one or more new candidate beams −X dB and the quality of the second one or more new candidate beams −Y dB). When the adjusted quality of the first one or more new candidate beams (i.e., the first bias, −X dB, is applied) is greater than (or equal to) the adjusted quality of the second one or more new candidate beams (i.e., the second bias, −Y dB, is applied), the WTRU may report the first one or more new candidate beams to a base station. When the adjusted quality of the second one or more new candidate beams is greater than (or equal to) the adjusted quality of the first one or more new candidate beams, the WTRU may report the second one or more new candidate beams to the base station. The value X and Y may be reported by the WTRU (e.g., by a PHR and/or a MAC CE).

Figure 8:
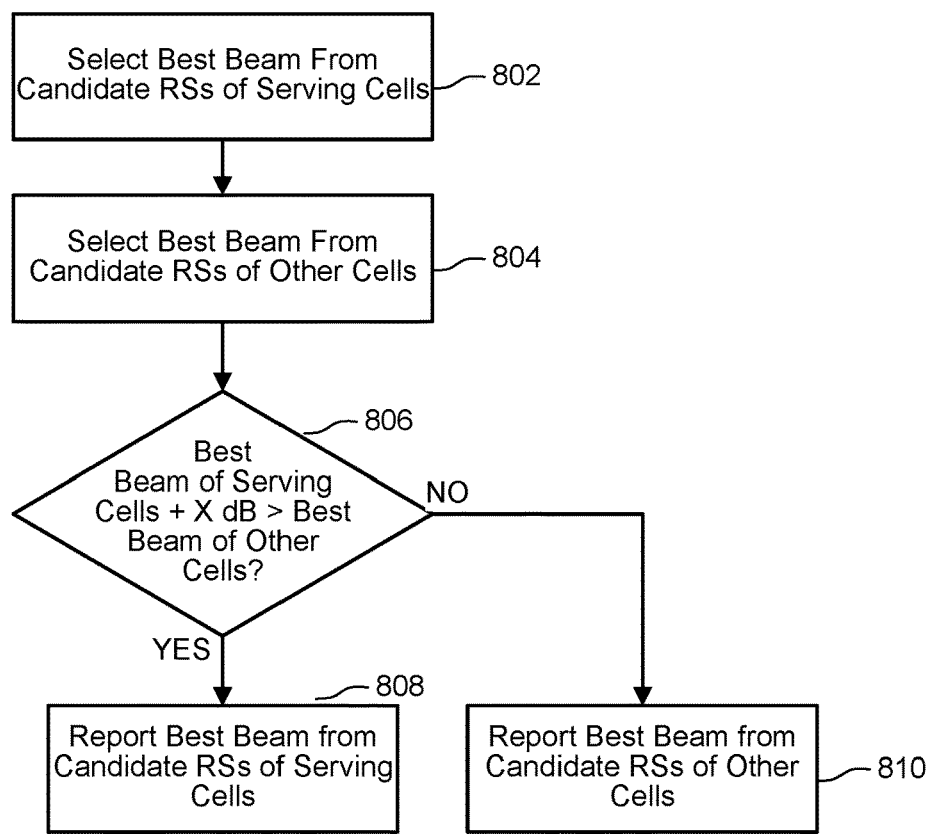
FIG. 8 is a flow diagram illustrating an example beam selection procedure.

FIG. 8 is a flow diagram illustrating an example beam selection procedure 800. Pursuant to the beam selection procedure 800, a WTRU may select a first best beam based on candidate RSs of serving cells (802). The WTRU may select a second best beam based on candidate RSs of other cells (e.g., non-serving cells) (804). The WTRU may determine whether the first best beam (or the second best beam) is an overall best beam (806). The WTRU, for example, may determine the overall best beam based on a comparison of the quality of the first best beam and the quality of the second best beam. The WTRU, for example, may determine the overall best beam based on a bias towards using the first best beam of the serving cells. The bias may be implemented by adding a number of dBs (X dBs) to the quality measurement of the first best beam. The WTRU may determine that the overall best beam is the first best beam and may report the first best beam (808). Alternatively, the WTRU may determine that the overall best beam is the second best beam, and may report the second best beam (810).

Figure 9:
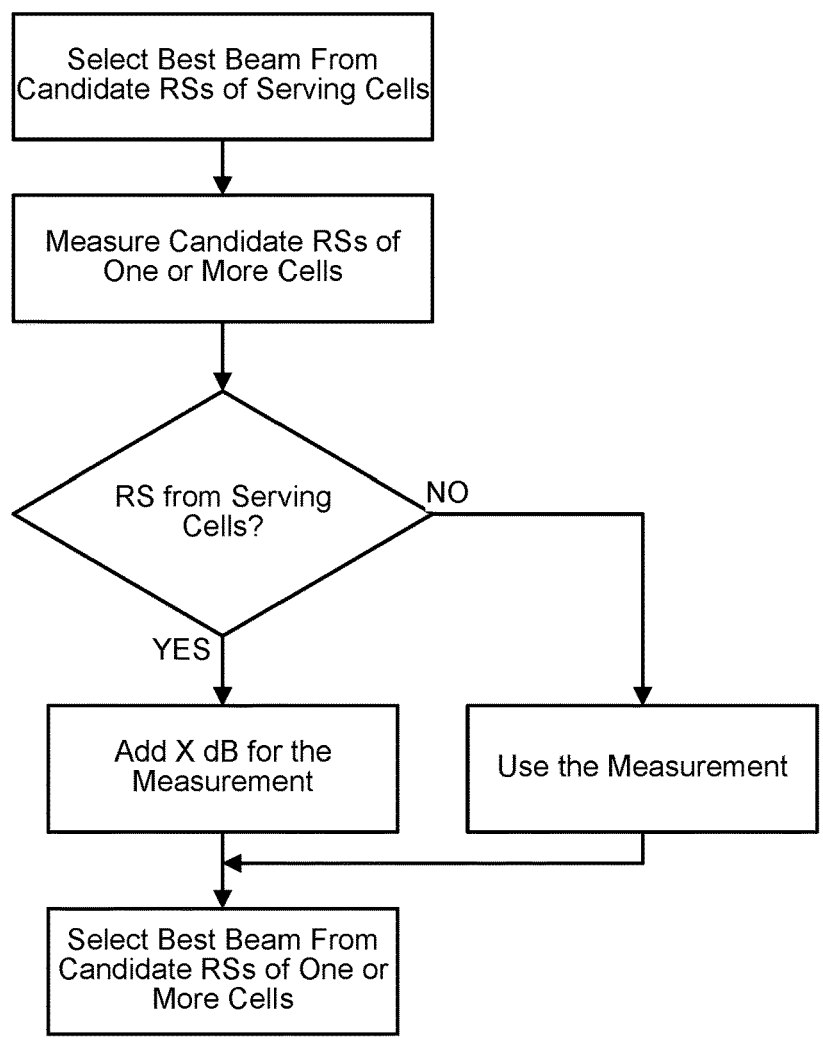
FIG. 9 is a flow diagram illustrating an example beam selection procedure.

FIG. 9 is a flow diagram illustrating an example beam selection procedure 900. Pursuant to the beam selection procedure 900, a WTRU determination among new candidate beams from one or more NCB-RS sets may be used. For example, the WTRU may select one or more new candidate beams based on one or more NCB-RS sets. The WTRU may add an additional value (bias), e.g., X dB, to the beam qualities of a first of the NCB-RS sets and may compare the biased beam qualities of the first NCB-RS set to the qualities of one or more of the remaining NCB-RS sets. The value X, may be predefined, configured in RRC configuration and/or reported by the WTRU (e.g., WTRU capability).

The WTRU may report one or more new candidate beams based on the comparison. Based on the first one or more new candidate beams and the second one or more new candidate beams, the WTRU may determine one of the first one or more new candidate beams and the second one or more new candidate beams.

In various embodiments, a prioritization among NCB-RS sets may be used. For example, the WTRU may determine or use a first NCB-RS set (e.g., higher priority) and if the WTRU cannot successfully determine one or more new candidate beams and/or successfully report the beam failure with the first NCB-RS set, the WTRU may determine or use a second NCB-RS set (e.g., lower priority). As another example, each NCB-RS set may be indexed with priority level and the WTRU may determine or use NCB-RS set based on the priority level index (e.g., from high to low, or vice versa). Herein, the priority level of NCB-RS set may be interchangeably used with NCB-RS set order and NCB-RS set sequence. One or more of following may apply:

A priority level of an NCB-RS set may be determined based on at least one of following:

CORESET/search space group type. For example, if a first NCB-RS set is based on a first type (e.g., joint TCI state indication) of one or more CORESETs and a second NCB-RS set is based on a second type (e.g., PDCCH reception of PUSCH/PDSCH scheduling) of one or more CORESETs, the WTRU may determine that the priority level of the first NCB-RS set is the highest priority level and/or that it is higher than the priority level of the second first NCB-RS.

an NCB-RS set index.

whether the NCB-RS set is associated with serving cell or non-serving cell. An NCB-RS set associated with serving cell may have a higher priority than an NCB-RS set associated with non-serving cell.

a PCID associated with the NCB-RS set. For example, an NCB-RS set with lower PCID number may have a higher priority or a higher priority level.

a number of new candidate beams in the NCB-RS set. For example, an NCB-RS set having a larger number of new candidate beams may have a higher priority than an NCB-RS set having a smaller number of new candidate beams.

whether the NCB-RS set is configured with a PCID. For example, an NCB-RS set without a PCID in the configuration may have a higher priority than an NCB-RS set with a PCID in the configuration.

whether the NCB-RS set is associated with a WTRU panel that has signaled or is affected by an MPE issue and/or SAR issue. An NCB-RS set associated with a WTRU panel that has signaled or is affected by an MPE issue and/or a SAR issue may be at a lower priority. For example, a WTRU may determine to use and/or start using an alternative ("the second") NCB-RS set based on the WTRU reporting P-MPR associated with a first NCB-RS set (e.g., based on an RS resource of the first NCB-RS set), where the P-MPR associated with the first NCB-RS set is larger than a P-MPR associated with the second NCB-RS set.

A WTRU may switch from an NCB-RS set to another NCB-RS set (e.g., from higher priority NCB-RS set to lower priority NCB-RS set) based on one or more of following:

One or more thresholds may be used (e.g., an NCB-Rsthreshold and/or an NCB-Rsthreshold2).

A first NCB-RS set (e.g., priority level-1) may be used for selecting one or more new candidate beams. If quality of a first NCB-RS set is equal to or higher than an NCB-Rsthreshold, the WTRU may report one or more new candidate beams based on the first NCB-RS set. If the quality of the first NCB-RS set is lower than an NCB-Rsthreshold, the WTRU may switch from a first NCB-RS set to a second NCB-RS set. If quality of a second NCB-RS set is equal to or higher than an NCB-Rsthreshold, the WTRU may report one or more new candidate beams based on the second NCB-RS set. If quality of the second NCB-RS set is lower than an NCB-Rsthreshold, the WTRU may initiate contention-based RACH procedure.

A first NCB-RS set (e.g., priority level-1) may be used for selecting one or more new candidate beams. If quality of a first NCB-RS set is equal to or higher than an NCB-Rsthreshold, the WTRU may report one or more new candidate beams based on the first NCB-RS set. If the quality of the first NCB-RS set is lower than an NCB-Rsthreshold, the WTRU may switch from a first NCB-RS set to a second NCB-RS set. If quality of a second NCB-RS set is equal to or higher than an NCB-Rsthreshold2, the WTRU may report one or more new candidate beams based on the second NCB-RS set. If quality of the second NCB-RS set is lower than NCB-an Rsthreshold2, the WTRU may initiate contention-based RACH procedure.

One or more timers may be used (e.g., NCB-RssetTimer).

A first NCB-RS set (e.g., priority level-1) may be used for selecting one or more new candidate beams while time remains on a timer. After the timer expires, a second NCB-RS set may be used.

A first NCB-RS set (e.g., priority level-1) may be used for selecting one or more new candidate beams while time remains on a first timer. After the first timer expires, a second NCB-RS set may be used while time remains on a second timer. After the second timer expires, a contention-based RACH procedure may be initiated.

The one or more timers may expire if a WTRU does not successfully select one or more new candidate beams within the time window.

The one or more timers may reset if a WTRU receives a DCI with C-RNTI or MCS-C-RNTI in the recoverySearchSpaceId, which is configured for beam failure recovery. Stated another way, the WTRU may not reset if the WTRU does not receive a DCI with C-RNTI or MCS-C-RNTI in the recoverySearchSpaceId.

A prohibit timer or an expiration timer related to the occurrence or disappearance of an MPE issue and/or a SAR issue. For example, the WTRU may be prohibited from changing sets (e.g., to avoid a ping-pong issue) when an MPE issue and/or a SAR issue occurs or disappears for a certain amount of time.

One or more counters may be used (e.g., an NCB-RssetCounter and/or an NCB-RS setCounter2)

A threshold may be used (e.g., maxNCB-Rsset-Counter). If the number of new candidate beam selections based on a first NCB-RS set and a corresponding NCB-RssetCounter is equal to or larger than a maxNCB-RssetCounter, a WTRU may switch from a first NCB-RS set to a second NCB-RS set.

A threshold may be used (e.g., a maxNCB-Rsset-Counter). If the number of new candidate beam selections based on a first NCB-RS set and a corresponding NCB-RssetCounter is equal to or larger than a maxNCB-RS setCounter, a WTRU may switch from a first NCB-RS set to a second NCB-RS set. If the number of new candidate beam selections based on a second NCB-RS set and a corresponding NCB-RssetCounter is equal to or larger than a maxNCB-RssetCounter, the WTRU may report one or more new candidate beams based on one or more UL resource sets.

A threshold may be used (e.g., a maxNCB-Rsset-Counter). If the number of new candidate beam selections based on a first NCB-RS set and a corresponding NCB-RssetCounter is equal to or larger than a maxNCB-RssetCounter, a WTRU may switch from a first BFD-RS set to a second NCB-RS set. If the number of new candidate beam selections based on a second NCB-RS set and a corresponding NCB-RssetCounter2 is equal to or larger than a maxBFD-RssetCounter, the WTRU may report one or more new candidate beams based on one or more UL resource sets.

A first threshold may be used (e.g., a maxBFD-Rsset-Counter). If the number of new candidate beam selections based on a first BFD-RS set and a corresponding BFD-RssetCounter is equal to or larger than a maxBFD-RssetCounter, a WTRU may switch from a first NCB-RS set to a second NCB-RS set. If the number of new candidate beam selections based on a second NCB-RS set and a corresponding NCB-RssetCounter2 is equal to or larger than a maxNCB-RssetCounter2, the WTRU may report one or more new candidate beams based on one or more UL resource sets.

In this disclosure, a number of new candidate beam selections may indicate a number WTRU trials to determine one or more new candidate beams based on one or more NCB-RS sets.

A base station configuration or indication.

Figure 10:
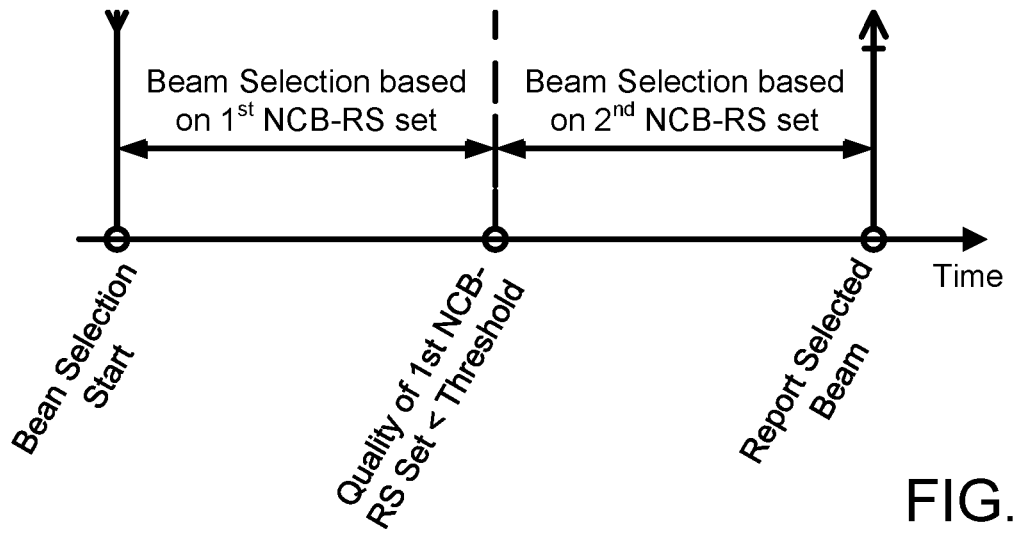
FIG. 10 illustrates an example sequential beam selection for BFR reporting.

FIG. 10 illustrates an example of sequential beam selection for BFR reporting.

Figure 11:
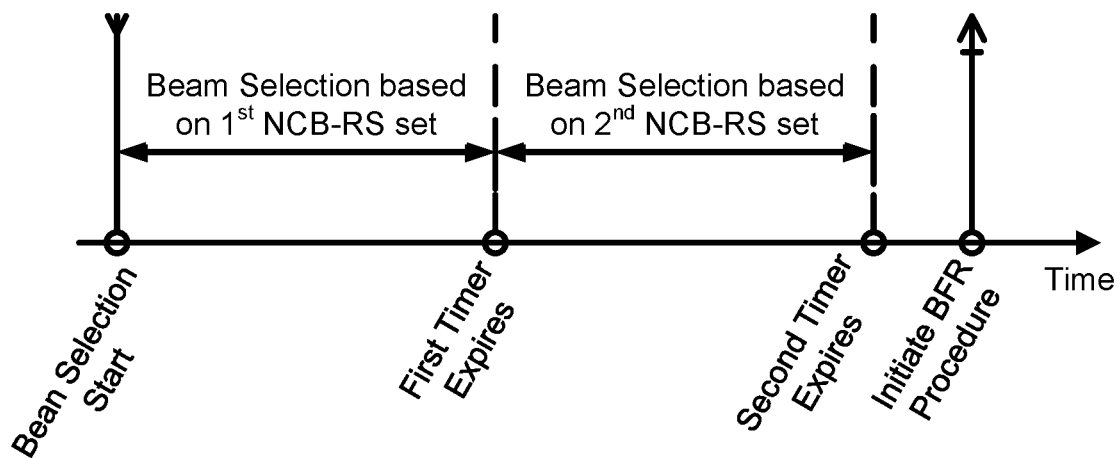
FIG. 11 illustrates an example sequential beam selection based on timers.

FIG. 11 illustrates an example of sequential beam selection based on timers.

In various embodiments, a WTRU may determine one or more sets of new candidate beams from one or more NCB-RS sets. The WTRU may report the one or more sets of new candidate beams based on one or more UL resource sets.

For joint BFR operation, a WTRU may be configured with one or more UL resource sets (e.g., PRACH resource, PUCCH resource and/or PUSCH resource) for multiple cells. In various embodiments, an uplink physical channel in the uplink resource may report beam based on explicit indication and/or implicit indication. In various embodiments, an uplink channel in the uplink resource may request uplink resources to transmit one or more BFR MAC CEs to a base station.

Configuration of the one or more UL resource sets may be based on one or more NCB-RS sets as follows:
- Configuration of the one or more UL resource sets may be based on an NCB-RS set which may be determined by a WTRU according to the methods in this disclosure. In this case, a determination or a prioritization of the WTRU may be among the one or more UL resource sets of the NCB-RS set.
- Configuration of the one or more UL resource sets may be based one or more NCB-RS sets. For example, an NCB-RS set may comprise an associated configuration of an UL resource set. In this case, a determination or a prioritization of the WTRU may be among pairs of an NCB-RS set and an UL resource set.

In various embodiments, a prioritization among UL resource sets may be used. For example, the WTRU may determine or use a first UL resource set (e.g., higher priority) and if the WTRU may not successfully indicate beam failure, report beam index and/or request uplink resources for MAC CE transmission with the first UL resource set, the WTRU may determine or use a second UL resource set (e.g., lower priority). As another example, each UL resource set may be indexed with priority level and the WTRU may determine or use UL resource set based on the priority level index (e.g., from high to low, or vice versa). Herein, the priority level of UL resource set may be interchangeably used with UL resource set order and UL resource set sequence. One or more of following may apply:
- A priority level of an UL resource set may be determined based on at least one of following:
- CORESET/search space group type. For example, if a first UL resource set is based on a first type (e.g., joint TCI state indication) of one or more CORESETs and a second UL resource set is based on a second type (e.g., PDCCH reception of PUSCH/PDSCH scheduling) of one or more CORESETs, the WTRU may determine that the priority level of the first UL resource set the highest priority level and/or that it is higher than a priority level of the second UL resource set.
- an UL resource set index.
- whether the UL resource set is associated with a serving cell or a non-serving cell. An UL resource set associated with a serving cell may have a higher priority than an UL resource set associated with a non-serving cell.
- whether a PCID is associated with the UL resource set. For example, an UL resource set with low(er) PCID number may have a higher priority or have a higher priority level.
- type of UL resource set. For example, an UL resource set for PRACH transmission may have a higher priority than an UL resource set for PUCCH transmission and/or PUSCH transmission. As another example, an UL resource set for PUCCH transmission may have a higher priority than an UL resource set for PUSCH transmission.
- whether the UL resource set is configured with a PCID. For example, an UL resource set without a PCID in the configuration may have a higher priority than an UL resource set with a PCID in the configuration.
- The UL resource set and/or its priority may be determined by the activation/deactivation of an MPE/SAR related human body proximity sensor.
- a PHR and/or a MAC CE indicating (e.g., signaling an indication of) MPE activation, an indication of SAR activation, and/or a periodic transmission. For example, the WTRU may lower the priority of the UL resource set based on the WTRU reporting a P-MPR associated with an UL resource set (e.g., where the P-MPR associated with the UL resource set is larger than a P-MPR associated with another UL resource set).

A WTRU may switch from an UL resource set to another UL resource set (e.g., from higher priority UL resource set to lower priority UL resource set) based on one or more of following:
- One or more timers may be used (e.g., uplinkResourcesetTimer).
- A first UL resource set (e.g., priority level-1) may be used for transmitting one or more uplink physical channels for BFR while time remains on a timer. After the timer expires, a second UL resource set may be used.
- A first UL resource set (e.g., priority level-1) may be used for transmitting one or more uplink physical channels for BFR while time remains on a first timer. After the first timer expires, a second UL resource set may be used while time remains on a second timer. After the second timer expires, a contention-based RACH procedure may be initiated.
- The one or more timers may expire if a WTRU does not successfully indicate one or more new candidate beams within the time window.
- The one or more timers may expire if a WTRU does not successfully request one or more uplink resources to transmit one or more MAC CEs within the time window.
- The one or more timers may reset if a WTRU receives a DCI with C-RNTI or MCS-C-RNTI in the recoverySearchSpaceId, which is configured for beam failure recovery. Stated another way, the WTRU may not reset if the WTRU does not receive a DCI with C-RNTI or MCS-C-RNTI in the recoverySearchSpaceId.
- The one or more timers may expire for MPE/SAR related sensor activation for a UE panel. For example, the WTRU may use a different panel for an uplink transmission when the P-MPR is (e.g., effectively) applied, which may occur after expiration of a timer started in response to a proximity sensor activation.
- One or more counters may be used (e.g., an uplinkResourcesetCounter and/or an uplinkResourcesetCounter2)
- A threshold may be used (e.g., a maxuplinkResourcesetCounter). If the number of uplink transmissions based on a first UL resource set and a corresponding uplinkResourcesetCounter is equal to or larger than a maxuplinkResourcesetCounter, a WTRU may switch from a first UL resource set to a second UL resource set.
- A threshold may be used (e.g., a maxuplinkResourcesetCounter). If the number of uplink transmissions based on a first UL resource set and a corresponding uplinkResourcesetCounter is equal to or larger than a maxuplinkResourcesetCounter, a WTRU may switch from a first UL resource set to a second UL resource set. If the number of uplink transmissions based on a second UL resource set and a corresponding uplinkResourceset- Counter is equal to or larger than a maxuplinkResourcesetCounter, the WTRU may initiate a contention-based RACH procedure.

A threshold may be used (e.g., a maxuplinkResourcesetCounter). If the number of uplink transmissions based on a first UL resource set and a corresponding uplinkResourcesetCounter is equal to or larger than a maxuplinkResourcesetCounter, a WTRU may switch from a first UL resource set to a second UL resource set. If the number of uplink transmissions based on a second UL resource set and a corresponding uplinkResourcesetCounter2 is equal to or larger than a maxuplinkResourcesetCounter, the WTRU may initiate a contention-based RACH procedure.

A first threshold may be used (e.g., a maxuplinkResourcesetCounter). If the number of uplink transmissions based on a first UL resource set and a corresponding uplinkResourcesetCounter is equal to or larger than a maxuplinkResourcesetCounter, a WTRU may switch from a first UL resource set to a second UL resource set. If the number of uplink transmissions based on a second UL resource set and a corresponding uplinkResourcesetCounter2 is equal to or larger than a maxuplinkResourcesetCounter2, the WTRU may initiate contention-based RACH procedure.

An UL symbol counter expiration or a slot counter expiration may be used for an MPE and/or SAR measurement based on a moving averaging window. For example, a UE capability may signal an UL duty cycle (e.g., a maximum percentage of active UL symbols at the maximum power). The WTRU may use a symbol or slot counter over a certain period or number of symbols or slots to determine whether a MPE issue and/or a SAR issue exceeds a threshold. The threshold may be a percentage or a scaled value of the duty cycle.

A base station configuration or indication.

Figure 12:
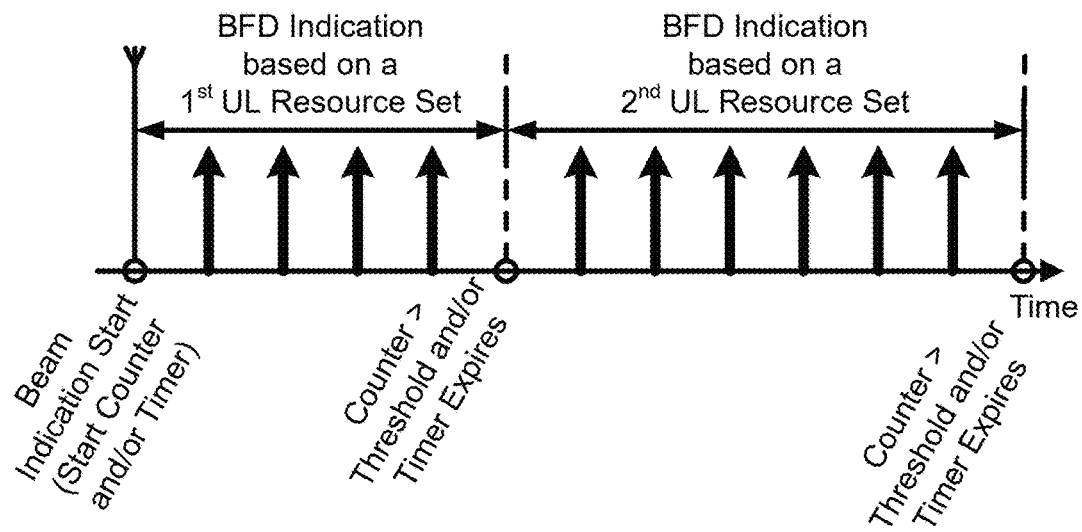
FIG. 12 illustrates an example beam indication based on multiple uplink resource sets.

FIG. 12 illustrates an example of beam indication based on a first UL resource set and a second UL resource set.

For joint BFR operation, a WTRU may be configured with one or more search space sets for multiple cells.

Configuration of the one or more UL resource sets may be based on one or more UL resource sets as follows:

Configuration of the one or more search space sets may be based on an UL resource set which may be determined by a WTRU according to the methods in this disclosure. In this case, a determination or a prioritization of the WTRU may be among the one or more search space sets of the UL resource set.

Configuration of the one or more search space sets may be based one or more UL resource sets. For example, an UL resource set may comprise an associated configuration of a search space set. In this case, a determination or a prioritization of the WTRU may be among pairs of an UL resource set and a search space set.

In various embodiments, a prioritization among search space sets may be used. For example, the WTRU may determine or use a first search space set (e.g., higher priority) and if the WTRU may not successfully receive confirmation random access response, the WTRU may determine or use a second search space set (e.g., lower priority). As another example, each search space set may be indexed with priority level and the WTRU may determine or use search space set based on the priority level index (e.g., from high to low, or vice versa). Herein, the priority level of search space set may be interchangeably used with search space set order and search space set sequence. One or more of following may apply:

A priority level of a search space set may be determined based on at least one of following:

CORESET/search space group type. For example, if a first search space set is based on a first type (e.g., joint TCI state indication) of one or more CORESETs and a second search space set is based on a second type (e.g., PDCCH reception of PUSCH/PDSCH scheduling) of one or more CORESETs, the WTRU may determine that the priority level of the first search space set is the highest priority level and/or that it is higher than a priority level of the second search space set.

a search space set index.

whether the search space set is associated with serving cell or non-serving cell. A search space set associated with serving cell may have a higher priority than a search space set associated with non-serving cell.

a PCID associated with the search space set. For example, a search space set with a low(er) PCID number may have a higher priority or has higher priority level.

whether the search space set is configured with a PCID. For example, a search space set without a PCID in the configuration may have a higher priority than a search space set with a PCID in the configuration.

a PHR and/or a MAC CE indicating (e.g., signaling an indication of) MPE activation, an indication of SAR activation, and/or a periodic transmission. For example, the WTRU may lower the priority of the search space set based on the WTRU reporting a P-MPR associated with the search space set (e.g. where the P-MPR associated with the search space set is larger than a P-MPR associated with another search space set).

A WTRU may switch from a search space set to another search space set (e.g., from higher priority search space set to lower priority search space set) based on one or more of following:

One or more timers may be used (e.g., searchSpacesetTimer).

A first search space set (e.g., priority level-1) may be used for receiving confirmation random access response while time remains on a timer. After the timer expires, a second search space set may be used.

A first search space set (e.g., priority level-1) may be used for receiving confirmation random access response while time remains on a first timer. After the first timer expires, a second search space set may be used while time remains on a second timer. After the second timer expires, a contention-based RACH procedure may be initiated.

The one or more timers may expire if a WTRU does not successfully receive a confirmation of a random access response within the time window.

The one or more timers may reset if a WTRU receives a DCI with C-RNTI or MCS-C-RNTI in the recoverySearchSpaceId, which is configured for beam failure recovery. Stated another way, the WTRU may not reset if the WTRU does not receive a DCI with C-RNTI or MCS-C-RNTI in the recoverySearchSpaceId.

One or more counters may be used (e.g., searchSpacesetCounter and/or searchSpacesetCounter2).

A threshold may be used (e.g., a maxsearchSpacesetCounter). If the number of search space receptions based on a first search space set and a corresponding searchSpacesetCounter is equal to or larger than a maxsearchSpacesetCounter, a WTRU may switch from a first search space set to a second search space set.

A threshold may be used (e.g., a maxsearchSpaceset-Counter). If the number of search space receptions based on a first search space set and a corresponding searchSpacesetCounter is equal to or larger than a maxsearchSpacesetCounter, a WTRU may switch from a first search space set to a second search space set. If the number of search space receptions based on a second search space set and a corresponding searchSpacesetCounter is equal to or larger than a maxsearchSpacesetCounter, the WTRU may initiate contention-based RACH procedure.

A threshold may be used (e.g., a maxsearchSpaceset-Counter). If the number of search space receptions based on a first search space set and a corresponding searchSpacesetCounter is equal to or larger than a maxsearchSpacesetCounter, a WTRU may switch from a first search space set to a second search space set. If the number of search space receptions based on a second search space set and an UL resource set searchSpacesetCounter2 is equal to or larger than a maxsearchSpacesetCounter, the WTRU may initiate a contention-based RACH procedure.

A first threshold may be used (e.g., a maxsearchSpace-setCounter). If the number of search space receptions based on a first search space set and a corresponding searchSpacesetCounter is equal to or larger than a maxsearchSpacesetCounter, a WTRU may switch from a first search space set to a second search space set. If the number of search space receptions based on a second search space set and a corresponding searchSpacesetCounter2 is equal to or larger than a maxsearchSpacesetCounter2, the WTRU may initiate contention-based RACH procedure.

a base station configuration or indication.

Figure 13:
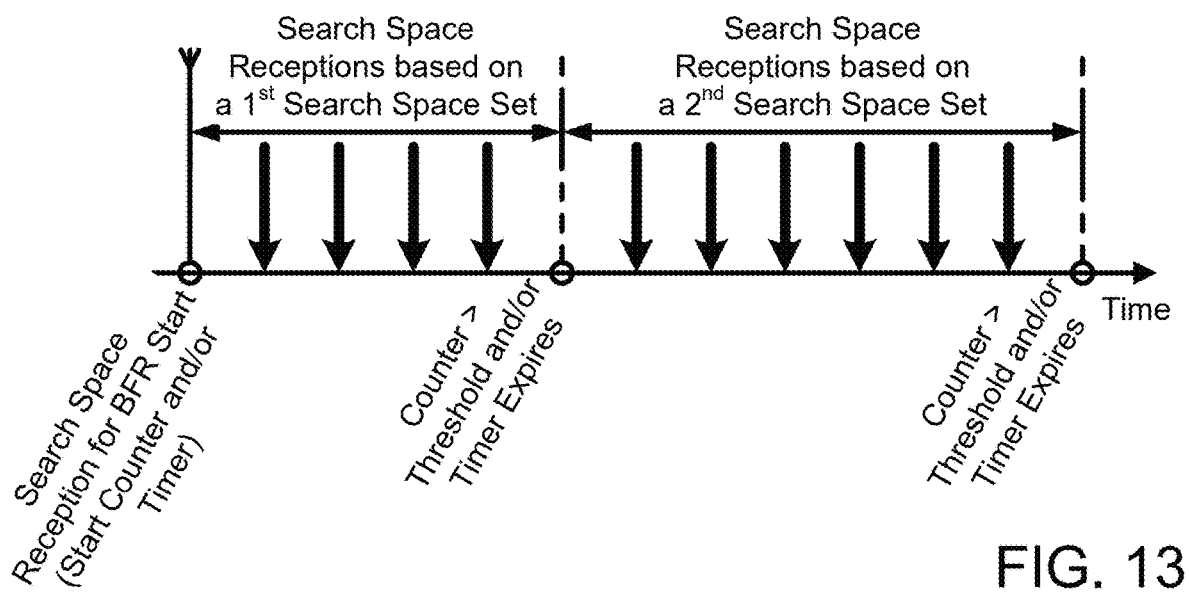
FIG. 13 illustrates an example beam indication based on multiple uplink resource sets.

FIG. 13 illustrates an example of beam indication based on first and second search space sets.

Herein, beam reporting may be interchangeably used with beam indication, new candidate beam reporting, and/or new candidate beam indication for beam failure recovery.

Herein, new candidate beam indication may be interchangeably used with beam failure indication.

Herein, CORESET may be interchangeably used with CORESET group, CORESET pool identity, higher layer index, search space, and/or search space group.

A WTRU may carry out BFR upon (responsive to, on condition of, etc.) dynamic failure (e.g., due to blockage, including any of a MPE and SAR related human body blockage) of PDCCH transmission/reception beams. The WTRU may support at least one or more of beam quality measurement; beam failure detection; new candidate beam selection; scheduling request for uplink resources; beam reporting (e.g., via uplink resources such as PRACH, PUCCH and/or PUSCH); and receiving a confirmation (e.g., via receiving a PDCCH for random access response).

A BFR procedure which is optimized to multiple PDCCH transmissions for a same DCI may be supported by a WTRU.

A WTRU may measure beam quality based on one or more reference signals associated with the beams and the beam quality measurement may include at least one of L1-RSRP, L1-SINR, CQI, radio link quality (e.g., hypothetical BLER of a DL/UL physical channel).

Beam quality may be measured from one or more reference signals (e.g., beam reference signals) associated with one or more CORESETs in an active BWP, for which a WTRU may be monitoring.

Beam quality may be affected by human body proximity, e.g., as signaled by proximity sensors activation.

Beam quality may be measured based on P-MPR and at least one or more of L1-RSRP, L1-SINR, CQI and radio link quality. For example, when the WTRU evaluates (e.g., compares) the qualities of beams, a bias based on a P-MPR (e.g., X dB) may be applied to (e.g., subtracted from) the quality/qualities of one or more beams.

Beam reporting to indicate one or more preferred beams at a WTRU side, one or more of following may be used:

Explicit indication. A WTRU may indicate one or more beam indices to a base station using an uplink physical channel (e.g., PUCCH, PUSCH, or PRACH). The uplink physical channel may carry the bit information of the beam indices.

Implicit indication. A WTRU may indicate one or more beam indices to a base station implicitly, wherein the beam indices may be indicated by selecting one or more uplink resources. For example, a set of uplink resources may be configured, and each uplink resource of the set of uplink resources may be associated with a beam. By sending one or more signals on the selected resources from the set of uplink resources, one or more beam indices or beam information may be indicated to a base station. As another example, one or more of PRACH resources may be configured and each of the one or more PRACH resource may be associated with one or more new candidate beam indices. A WTRU may send one or more PRACH transmissions in the PRACH resources associated with the determined candidate beam indices. As another example, a set of reporting resources may be configured wherein each of the reporting resources may comprise one or more uplink resources and each the one or more uplink resources may be associated with a beam. By sending one or more signals on selected resources from the set of reporting resources, one or more beam indices or beam information may be indicated to a base station. As another example, a set of reporting resources may be configured wherein each of the reporting resources may comprise one or more PRACH resources. Each of the one or more PRACH resource may be associated with one or more new candidate beam indices. A WTRU may send one or more PRACH transmissions in the PRACH resources associated with the determined candidate beam indices.

A WTRU may indicate one or more beam indices to base station implicitly by selecting one or more sequences. For example, a set of sequences may be used, and one or more sequences of the set may be associated with one or more beams. A WTRU may determine one or more sequences based on the selected new candidate beam indices.

A WTRU may indicate one or more RS indices, one or more RS resource indices and/or RS resource set indices, wherein RS may indicate SSB and/or any of RS in NR (e.g., CSI-RS, TRS, DM-RS, SRS, PT-RS, PRS, etc.).

In various embodiments, a WTRU may support beam failure detection for a multi-PDCCH BFR procedure. For example, a WTRU may be configured with a set of beam failure detection (BFD) resources (e.g., $\bar{q}_0$). The WTRU may support beam failure detection by using at least one of following configurations and procedures:

Each BFD resource of $\bar{q}_0$ may comprise one or more of BFD-RSs. A WTRU may measure quality based on a BFD resource of $\bar{q}_0$.

For example, a first BFD-RS of a BFD resource may be associated with a first CORESET and a second BFD-RS of the BFD resource may be associated with a second CORESET. A WTRU may measure quality of the BFD resource based on both the first BFD-RS and the second BFD-RS (e.g., assuming the first CORESET and the second CORESET may be used to transmit PDCCHs with same DCI).

In a configuration of a BFD resource, if the BFD resource is for a single PDCCH BFR procedure, the BFD resource may comprise one BFD-RS. If the BFD resource is for a multi-PDCCH BFR procedure, the BFD resource may comprise two or more BFD-RSs.

A WTRU may receive information for configuring BFD resources via signaling (e.g., any of L1, L2, L3 and other layer signaling). The information may specify/indicate some or all of the BFD resources explicitly ("explicit BFR-resource configuration information"). The information may indicate some or all of the BFR resources referentially. For example, the information might not specify/indicate some or all of the BFR resource explicitly and may include other information (e.g., information for one or more other configurations) and an indication to invoke the WTRU to determine (e.g., process one or more (pre)configured rules for determining) some or all of the BFR resource based on and/or using the other information. Alternatively, the information might not specify/indicate some or all of the BFR resource explicitly and may include other information (e.g., information for one or more other configurations). The WTRU may determine (e.g., process one or more (pre)configured rules for determining) some or all of the BFR resources based on and/or using the other information. As an example, the WTRU might not receive explicit configuration information for (e.g., due to signaling of explicit BFD resource configuration not being supported) and may receive information for configuring one or more TCI states for PDCCH reception. The WTRU may determine the BFD resource based on or using one or more RSs with QCL Type-D of the (configured) TCI states.

In various embodiments, if a TCI state comprises multiple RSs for QCL Type-D (e.g., for multi-PDCCH transmission), the WTRU may determine one or more BFD-RS sets based on one or more of following:

The WTRU may set one or more RSs of a TCI state as RSs of a BFD resource. The WTRU may determine orders of the RSs of a BFD resource based on associations between the TCI state and CORESETs (e.g., based on CORESET pool IDs of the TCI state). For example, the WTRU may set a first of the RSs of the TCI state as a first RS of a BFD resource based on the first RS including (and/or being associated with) a first CORESET pool ID or no CORESET pool ID. The WTRU may set a second of the RSs of the TCI state as a second RS of the BFD resource based on the second RS including (and/or being associated with) a second CORESET pool ID. The WTRU may support monitoring a group of RSs (e.g., the first and second RSs) when the WTRU supports setting multiple RS of a TCI state as multiple RS of the BFD resource.

In various embodiments, if PDCCH transmission utilizes multiple TCI states for QCL Type-D (e.g., for multi-PDCCH transmission), the WTRU may determine BFD-RS based on one or more of following:

The WTRU may set RSs of multiple TCI states as RSs of a BFD resource. The WTRU may determine orders of the RSs of a BFD resource based on associations between the TCI states and CORESETs (e.g., based on CORESET pool IDs of the TCI states). For example, the WTRU may set an RS of a first of the multiple TCI states as a first RS of a BFD resource based on the first TCI state including (and/or being associated with) a first CORESET pool ID or no CORESET pool ID. The WTRU may set an RS of a second of the multiple TCI states as a second RS of the BFD resource based on the second TCI state including (and/or being associated with) a second CORESET pool ID. The WTRU may support monitoring a group of RSs (e.g., the first and second RSs) when the WTRU supports setting RS of multiple TCI states as multiple RS of the BFD resource or setting multiple RSs of a TCI state as multiple RSs of the BFD resource.

Group based monitoring of the RSs of a BFD resource may be as disclosed above and/or based on one or more of following:

For example, the WTRU may measure qualities of the multiple RSs as a group. The measurement may be based on one or more of following:
an average quality of the multiple RSs;
a minimum quality of the multiple RSs;
a maximum quality of the multiple RSs;
a quality assuming multiple PDCCH combining based on the multiple RSs;
a number of RSs of the multiple RSs having an acceptable quality satisfying a threshold (e.g., the WTRU may report beam failure if the number of RSs having an acceptable quality is less than (or equal to) the threshold and might not determine and/or report beam failure if the number of RSs having an acceptable quality greater than (or equal to) the threshold; and
a number of RSs of the multiple RSs having an unacceptable quality satisfying a threshold (e.g., the WTRU may report beam failure if the number of RSs having an unacceptable quality is greater than (or equal to) the threshold, and might not report beam failure if the number of RSs having an unacceptable quality is less than (or equal to) the threshold.

Each BFD resource of $\bar{q}_0$ may comprise a BFD-RS, wherein the BFD-RS may be associated with a CORESET. A WTRU may measure quality based on one or more BFD resources of $\bar{q}_0$.

For example, a first BFD-RS of a first BFD resource may be associated with a first CORESET and a second BFD-RS may be associated with a second CORESET. A WTRU may measure quality of the resources based on both the first BFD-RS and the second BFD-RS (e.g., assuming the first CORESET and the second CORESET may be used to transmit PDCCHs with same DCI)

A WTRU may measure quality of the one or more BFD resources of $\bar{q}_0$ with one or more of following:
Exhaustive measurements of all possible combinations.
Measurements based on base station configuration or indication. For example, a WTRU may be provided with an association between a first BFD resource and a second BFD resource in configurations of the first BFD resource and the second BFD resource. If the WTRU is provided the first BFD resource with an association with the second BFD resource, the WTRU may measure quality of the first BFD resource and the second BFD resource (e.g., multi-PDCCH BFR) based on the association. If the WTRU is provided the first BFD resource without an association with the second BFD resource, the WTRU may measure based on the first BFD resource (e.g., single-PDCCH BFR).

In various embodiments, a WTRU may support new candidate beam selections and beam reporting for a multi-PDCCH BFR procedure. For example, a WTRU may be configured with a set of new candidate beam (NCB) resources (e.g., $\bar{q}_1$). The WTRU may support beam selections and beam reporting by using at least one of following configurations and/or procedures:

Each NCB resource and/or NCB-RS of $\bar{q}_1$ may be associated with one or more uplink resources (e.g., PRACH, PUCCH, PUSCH, and/or SRS).

Each NCB resource of $\bar{q}_1$ may comprise a plurality of NCB-RSs. A WTRU may select new candidate beams and report the selected new candidate beams based on an NCB resource of the NCB resource set. For example, a first NCB-RS of an NCB resource may be associated with a first uplink resource and a second NCB-RS of the NCB resource may be associated with a second uplink resource. A WTRU may select new candidate beams by selecting one NCB resource of $\bar{q}_1$ and may report the new candidate beams by transmitting uplink signals in the first uplink resource and the second uplink resource. In a configuration of an NCB resource, if the NCB resource comprises one NCB-RS, the WTRU may select anew candidate beam and report the new candidate beam (e.g., single-PDCCH BFR). If the NCB resource comprises two or more NCB-RSs, the WTRU may select two or more new candidate beams and report the two or more new candidate beams. In $\bar{q}_1$, a first NCB resource which comprises two or more NCB-RSs (e.g., multi-PDCCH BFR) and a second NCB resource which comprises one NCB-RS (e.g., single-PDCCH BFR) may coexist.

Each NCB resource of $\bar{q}_1$ may comprise an NCB-RS, wherein the NCB-RS may be associated with a CORE-SET. A WTRU may select new candidate beams and report the selected new candidate beams by selecting one or more NCB resources of $\bar{q}_1$. For example, a first NCB-RS of a first NCB resource may be associated with a first uplink resource and a second NCB-RS of a second NCB resource may be associated with a second uplink resource. A WTRU may select one or more new candidate beams by selecting one or more NCB resources of $\bar{q}_1$ and may report the new candidate beams by transmitting uplink signals in the first uplink resource and the second uplink resource. A WTRU may select one or more NCB resources of $\bar{q}_1$ with one or more of following:

Exhaustive searching of all possible combinations.

Searching based on base station configuration or indication. For example, a WTRU may be provided an association between a first NCB resource and a second NCB resource in configurations of a first NCB resource and a second NCB resource. If the WTRU is provided the first NCB resource with an association with the second NCB resource, the WTRU may measure quality of the first NCB resource and the second NCB resource (e.g., multi-PDCCH BFR) based on the association. If the WTRU is provided the first NCB resource without an association with the second NCB resource, the WTRU may measure based on the first NCB resource (e.g., single-PDCCH BFR). In $\bar{q}_1$, a first NCB resource with an association with a second resource and a third NCB resource without an association may coexist A WTRU may support different new candidate beam selection procedures for a multi-PDCCH BFR procedure. For example, when a WTRU supports multi-PDCCH BFR, the WTRU may select a first group of new candidate beams from NCB resources and/or NCB-RSs which support multi-PDCCH BFR based on a first quality metric (e.g., RSRP, RSRQ, SINR or PDCCH hypothetical BLER). The WTRU may also select a second group of new candidate beams from NCB resources and/or NCB-RSs which support single-PDCCH BFR based on a second quality metric (e.g., RSRP, RSRQ, SINR or PDCCH hypothetical BLER). Based on the first group, the second group and a third quality metric (e.g., RSRP, RSRQ, SINR PDCCH hypothetical BLER and/or MPE/SAR active proximity sensors), the WTRU may determine new candidate beams to report to a base station. The first quality metric and the second quality metric may be identical.

In a multi-PDCCH BFR procedure, a WTRU may support one or more of following configurations and procedures:

A WTRU may be configured with a set of uplink resources ($S_0$) for new candidate beam indication. Each uplink resource of $S_0$ may correspond to each NCB-RS of an NCB resource of $\bar{q}_1$. Each uplink resource of $S_0$ may correspond to each NCB resource of $\bar{q}_1$.

A WTRU may be configured with a set of search spaces ($C_0$) for receiving one or more confirmation random access responses of a BFR. Each search space of $C_0$ may correspond to each uplink resources of $S_0$.

In a multi-PDCCH BFR procedure, a WTRU may support multiple thresholds for a counter and/or multiple timers. A WTRU may be configured with two or more timers (e.g., single-PDCCHBFRtimer and multi-PDCCHBFRtimer). If BFR configurations comprise multi-PDCCH BFR resources (e.g., at least one of BFD resources, NCB resources, uplink resources and search space resources for multi-PDCCH BFR), a multi-PDCCHBFRtimer may expire if the WTRU does not successfully recover the beam failure within a time window. If BFR configurations only comprise single-PDCCH BFR resources (e.g., BFD resources, NCB resources, uplink resources and search space resources for single-PDCCH BFR), single-PDCCHBFRtimer may expire if the WTRU does not successfully recover the beam failure within a time window.

A WTRU may be configured with two or more thresholds (e.g., maxSingle-PDCCHBFR and maxMulti-PDCCHBFR). If BFR configurations comprise multi-PDCCH BFR resources (e.g., at least one of BFD resources, NCB resources, uplink resources and search space resources for multi-PDCCH BFR), the WTRU may apply the maxMulti-PDCCHBFR. For example, a counter (e.g., a number of WTRU trial on new candidate beam selections) may be equal to or larger than maxMulti-PDCCHBFR if the WTRU does not successfully recover the beam failure. If BFR configurations comprise single-PDCCH BFR resources (e.g., BFD resources, NCB resources, uplink resources and search space resources for single-PDCCH BFR), the WTRU may apply the maxSingle-PDCCHBFR. For example, a counter (e.g., a number of WTRU trial on new candidate beam selections) may be equal to or larger than maxSingle-PDCCHBFR if the WTRU does not successfully recover the beam failure.

One or more of modes of operation (e.g., multi-PDCCH BFR or single-PDCCH BFR) may be used for beam failure recovery request. The number of RSs in a resource for at least one of BFD-RS set, NCB-RS set, and UL resource set may be determined based on the mode of operation. One or more of following may apply:

- A mode of operation may be determined based on one or more RSs in a resource. The numbers of RSs in a resource may comprise at least one of the number of RSs in a BFD-RS set, the number of RSs in an NCB-RS set and the number of uplink resources in UL resource set associated with the BFR procedure.
- A mode of operation may be determined based on the number of CORESET pool IDs associated with the BFR procedure. For example, if two CORESET pool IDs (e.g., one for a first TRP and another for a second TRP) are configured for at least one of BFD-RS set, NCB-RS set, UL resource set and search space set, the WTRU may consider such condition as an indication of a first mode of operation (e.g., multi-PDCCH BFR). If a single CORESET pool ID or no CORESET pool ID is configured, the WTRU may consider such condition as an indication of a second mode of operation (e.g., single-PDCCH BFR). As another example, the mode of operation may be determined based on whether CORESET is configured with CORESET pool ID or not.
- A mode of operation may be determined based on an MPE/SAR sensor activation event occurring.
  - A WTRU that detects an MPE/SAR proximity sensor activation may move to a single PDCCH operation for the duration of the event, for example.
  - A WTRU may determine that a multi PDCCH operation is optimal (e.g., is again optimal) following detection of a proximity sensor deactivation and/or after expiration of a prohibit timer (e.g. used to avoid a ping-pong issue).
  - A WTRU reporting on P-MPR may be used to determine a mode of operation. For example, if a reported P-MPR is smaller than a threshold, the WTRU may operate in a first mode of operation (e.g., multi-PDCCH BFR). If a reported P-MPR is larger than the threshold, the WTRU may operate in a second more of operation (e.g., single PDCCH-BFR). Alternatively, if a reported P-MPR is larger than a threshold, the WTRU may operate in a first mode of operation (e.g., multi-PDCCH BFR). If a reported P-MPR is smaller than the threshold, the WTRU may operate in a second more of operation (e.g., single PDCCH-BFR). The thresholds may be predefined, indicated/signaled by a base station or another network element, and/or based on/determined by WTRU implementation.
- A mode of operation may be determined based on a WTRU capability and base station configuration based on the WTRU capability reporting.
- A mode of operation may be determined based on the number of CORESETs associated with TCI states associated with at least one of a BFR set, a BFD-RS set, a NCB-RS set, an UL resource set and a search space set. For example, if TCI states associated with at least one of a BFD-RS set, a NCB-RS set, a UL resource set and one or more CORESETs associated with a search space set comprises two CORSET pool IDs (e.g., one for a first TRP and another for a second TRP), the WTRU may consider such condition as an indication of a first mode of operation (e.g., multi-PDCCH BFR). If each TCI state associated with a BFD-RS set, a NCB-RS set, a UL resource set and one or more CORESETs associated with a search space set comprises a single CORESET pool ID or no CORESET Pool ID is configured, the WTRU may consider such condition as an indication of a second mode of operation (e.g., single-PDCCH BFR). As another example, if TCI states associated with at least one of a BFD-RS set, a NCB-RS set, an UL resource set and one or more CORESETs associated with a search space set comprises TRS resource sets associated with two CORESET Pool IDs, the WTRU may consider such condition as an indication of a first mode of operation (e.g., multi-PDCCH BFR). If each TCI states associated with a BFD-RS set, an NCB-RS set, an UL resource set and one or more CORESETs associated with a search space set comprises a single PCID or no PCID is associated with TRS resource sets, the WTRU may consider such condition as an indication of a second mode of operation (e.g., single-PDCCH BFR). In this disclosure, CORESET pool IDs associated with TCI states associated with at least one of BFR set, BFD-RS set, NCB-RS, UL resource set may be referred as associated CORESET pool IDs as well as other association methods (e.g., explicit association by configuring CORESET pool IDs).
- A WTRU may request its preferred mode of operation for beam failure recovery. For example, if a WTRU is capable to support both modes of operation and the measurements at a WTRU indicates a preferred mode of operation, the WTRU may indicate to base station for the preferred mode of operation. If beam quality measurements based on one or more RSs are less than (or higher than) a threshold, the WTRU may indicate a first mode of operation as a preferred mode of operation. For example, if beam quality measurements based on a RS are less than a threshold, the WTRU may consider it as a first mode of operation (e.g., multi-PDCCH BFR). If beam quality measurements based on a RS are equal to or larger than a threshold, the WTRU may consider it as a second mode of operation (e.g., single-PDCCH BFR).

Herein, a beam-group may refer to a sub-set of beams in a single or multi-TRP scenario. A beam-group may be corresponding to an index, e.g., a CORESETpoolindex, etc. When operating in FR2, channel variations and impairments may occur at a very high rate. Therefore, the conventional BFR process that is based on CSI-RS measurement, report and beam re-selection may not be sufficiently fast. A slow BFR process has a negative impact on the control overhead, as a new beam may become outdated fast, and control signaling may be repeatedly called upon for new beam selection. Hence to accelerate beam switching and reduce latency, a WTRU-based beam switching may be employed.

Figure 14:
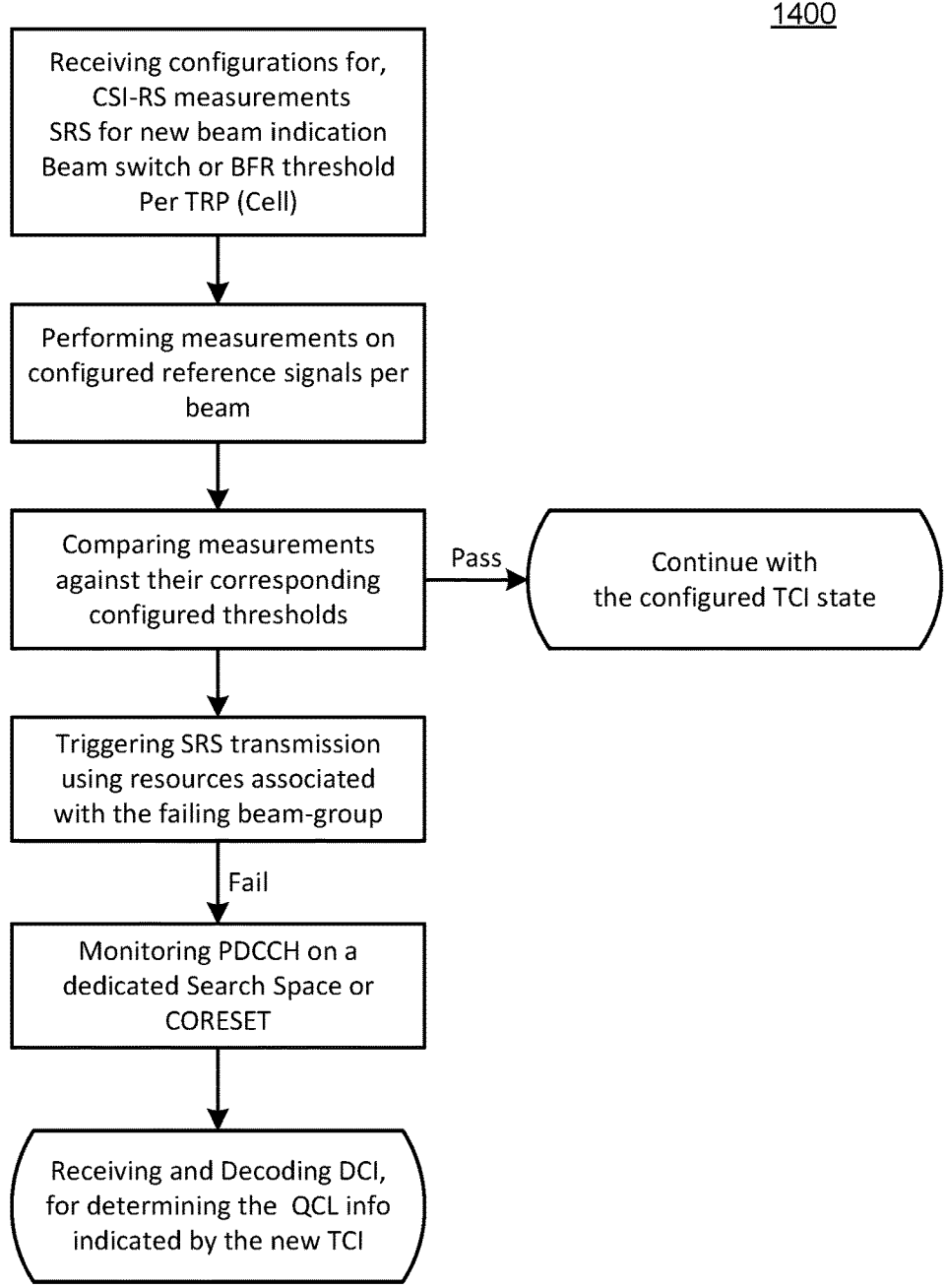
FIG. 14 is a flow diagram illustrating an example fast beam switching procedure.

FIG. 14 is a flow diagram illustrating an example fast beam switching procedure 1400. The procedure 1400 may include any of receiving CSI-RS, SRS and BFR thresholds, performing measurements, comparing against a threshold, triggering an aperiodic SRS transmission, monitoring PDCCH and updating TCI information.

In various embodiments, a WTRU may be configured with a set of time and frequency reference resources to monitor multiple downlink beams associated with different transmission points of a same cell or of different cells. The configured reference signals for all beams may be based on one type of reference signals, e.g., CSI-RS, SSB resources, or a combination thereof. The configured reporting per reference signal may include any of a Channel Quality Indicator (CQI), a precoding matrix indicator (PMI), a CSI-RS resource indicator (CRI), a SS/PBCH Block Resource indicator (SSBRI), a layer indicator (LI), a rank indicator (RI), L1-RSRP, L1-SINR, etc. A same trigger state or different trigger states and different report setting may be configured for measurements related to the monitored the beams per TRP or cell.

In various embodiments, if a configured measurement corresponding to one of the downlink beams does not meet a configured threshold, e.g., RSRP, SINR, a WTRU may indicate a BFR for the failed beam. Such BFR indication may be triggered only if the related measurement consistently fails a predefined behavior or threshold. An exact condition for BFR may be defined based on a configured duration or instances of failures. A target performance threshold may be defined in an anticipatory manner to warn a potential BFR prior to an actual BFR event. In various embodiments, a WTRU may initiate the process only based on failure of the candidate beams, and not the current beam itself. A WTRU may initiate a BFR event (e.g., change beams) in connection with an MPE/SAR related event determined based on a UL power measurement over an averaging window for its UL symbols. The BFR event may be initiated due to reaching a threshold that may impose a P-MPR power reduction.

Upon determination of such event, a WTRU may indicate a BFR state by triggering an SRS transmission, e.g., an aperiodic SRS transmission. In various embodiments, for a WTRU configured in a downlink multi-TRP transmission, a WTRU may be configured with different subsets of SRS resources where each subset is intended for BFR indication related to a TRPS.

In various embodiments, a WTRU may be configured with an SRS resource set where one or more of SRS resources are for BFR indication of a first beam-group and one or more of remaining SRS resources are for BFR indication of a second beam-group.

In various embodiments, a WTRU may be configured with more than one SRS resource set where one or more SRS resources of each set are considered for BFR indication of their corresponding beam-groups.

In various embodiments, the configured SRS resources of a TRP may be divided into several subsets, where one subset may be used for BFR indication of the main/current beam-group and the other subsets may be used for BFR indication of other candidate beam-groups.

The indication of the BFR may be directed to the main or the failing TRP itself. As such, the spatial information for SRS transmission may be configured according to the TCI state of each TRP. A WTRU may trigger SRS transmission only to the TRP with the failing beam-group, if after a configured time window, a WTRU did not receive any updated TCI information, it may then re-trigger the SRS transmission using the TCI information of the main cell.

In NR, a WTRU may be configured by higher layer signaling with a set of TCI states where each TCI state may carry QCL information related to the reference signal antenna ports that are utilized for PDCCH and/or PDSCH (DMRS) transmission. A subset of RRC-configured TCI states may be indicated to a WTRU through a MAC CE information element.

In various embodiments, after reception of the SRS, a base station may determine the TRP corresponds to the failing beam-group and may indicate a new TCI state to the WTRU. For instance, when scheduling follows up downlink transmissions, the TCI state of the new downlink beam is indicated to the WTRU by a DCI, e.g., DCI Format 1-1 or 1-0. To monitor PDCCH, a WTRU may use a dedicated search space or CORSET, e.g., CORESET 0, for acquiring the new TCI state. If the measurements performed on the SRS indicates a new beam that its QCL information is not captured by any of the MAC CE activated states, a WTRU may receive and decode a new MAC prior to decoding the DCI.

Incorporated herein by reference are:
[1] 3GPP TS 38.213, "NR Physical layer procedures for control", v15.3.0
[2] 3GPP TS 38.321, "Medium Access Control (MAC) protocol specification", v15.1.0
[3] 3GPP TS 38.331, "Radio Resource Control (RRC) protocol specification", v15.4.0
[4] 3GPP TS 38.101-1, "User Equipment (UE) radio transmission and reception; Part 1: Range 1 Standalone", V16.2.0
[5] 3GPP TS 38.101-1, "User Equipment (UE) radio transmission and reception; Part 2: Range 2 Standalone", V16.2.0
[6] 3GPP TS 38.101-1, "User Equipment (UE) radio transmission and reception; Part 3: Range 1 and Range 2 Interworking operation with other radios", V16.2.1

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, the term "video" may mean any of a snapshot, single image and/or multiple images displayed over a time basis. As another example, when referred to herein, the terms "user equipment" and its abbreviation "UE" may mean (i) a wireless transmit and/or receive unit (WTRU), such as described supra; (ii) any of a number of embodiments of a WTRU, such as described supra; (iii) a wireless-capable and/or wired-capable (e.g., tetherable) device configured with, inter alia, some or all structures and functionality of a WTRU, such as described supra; (iii) a wireless-capable and/or wired-capable device configured with less than all structures and functionality of a WTRU, such as described supra; or (iv) the like. Details of an example WTRU, which may be representative of any UE recited herein, are provided above with respect to FIGS. 1A-1D.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM")) or non-volatile (e.g., Read-Only Memory (ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A method implemented in a wireless transmit/receive unit (WTRU), the method comprising:
   determining a first set of beam failure detection reference signals and a second set of beam failure detection reference signals based on information indicated by one or more transmission configuration indicator states associated with first and second control resource set pools, respectively;
   receiving first information indicating a first set of reference signals and a second set of reference signals, wherein the first set of reference signals corresponds to the first set of beam failure detection reference signals, and wherein the second set of reference signals corresponds to the second set of beam failure detection reference signals;
   determining at least one beam failure based on any of the first set of beam failure detection reference signals and the second set of beam failure detection reference signals;
   determining a reference signal from one of the first and second sets of reference signals based on the determined at least one beam failure; and
   transmitting second information indicating the determined reference signal and indicating the one of the first and second sets of beam failure detection reference signals associated with the determined reference signal.

2. The method of claim 1, wherein;
   the first information indicates (i) one uplink resource set associated with at least one of the first and second sets of reference signals, or (ii) first and second uplink resource sets associated with the first and second sets of reference signals, respectively; and
   the second information is transmitted using (i) the one uplink resource set, (ii) the first uplink resource set based on the determined at least one beam failure being a beam failure based on the first set of beam failure detection reference signals, or (iii) the second uplink resource set based on the determined at least one beam failure being a beam failure based on the second set of beam failure detection reference signals.

3. The method of claim 1, wherein determining a reference signal from one of the first and second sets of reference signals comprises:
   determining, from one of the first and second sets of reference signals, a reference signal having a best quality; and
   using the reference signal having the best quality as the determined reference signal.

4. The method of claim 1, wherein the first information indicates a downlink resource set for each of the first and second sets of reference signals, the method comprising:
   selecting the downlink resource set associated with the determined reference signal; and
   monitoring one or more downlink resources of the downlink resource set for information indicating at least one of (i) any of a confirmation, an acknowledgement and a non-acknowledgement of the at least one beam failure, and (ii) any of a confirmation, an acknowledgement and a non-acknowledgement of receipt of the second information.

5. The method of claim 1, wherein determining the first set of beam failure detection reference signals and the second set of beam failure detection reference signals comprises:
   determining the first set of beam failure detection reference signals and the second set of beam failure detection reference signals from among a plurality of reference signals associated with a plurality of control resource set pools, based on first and second identifiers of the first and second control resource set pools of the plurality of control resource set pools.

6. The method of claim 1, comprising:
   receiving first control resource set configuration information and second control resource set configuration information, wherein the first control resource set configuration information indicates a first identifier of the first control resource set pool and a first set of transmission configuration indicator states, and wherein the second control resource set configuration information indicates a second identifier of the second control resource set pool and a second set of transmission configuration indicator states, and
   wherein determining first and second sets of beam failure detection reference signals comprises determining the first and second sets of beam failure detection reference signals based on the first and second identifiers of the first and second control resource set pools, and the first and the second sets of transmission configuration indicator states.

7. The method of claim 1, wherein transmitting the second information comprises any of:
   transmitting a physical random access channel transmission comprising the second information using one or more physical random access channel resources associated with the determined reference signal; and
   transmitting a physical uplink control channel transmission comprising the second information using one or more physical uplink control channel resources associated with the determined reference signal.

8. The method of claim 1, wherein the transmitting of the second information comprises tranmitting a medium access control (MAC) control element (CE), that indicates the second information.

9. The method of claim 1, wherein the second information indicates a cell associated with the one of the first and second sets of beam failure detection reference signals associated with the determined reference signal.

10. The method of claim 1, further comprising:
    initiating a random access procedure on a condition that beam failure recovery is not successful for both the first and second sets of reference signals.

11. A wireless transmit/receive unit (WTRU) comprising circuitry, including any of a transmitter, receiver, processor and memory, configured to determine a first set of beam failure detection reference signals and a second set of beam failure detection reference signals based on information indicated by one or more transmission configuration indicator states associated with first and second control resource set pools, respectively;

receive first information indicating a first set of reference signals and a second set of reference signals, wherein the first set of reference signals corresponds to the first set of beam failure detection reference signals, and wherein the second set of reference signals corresponds to the second set of beam failure detection reference signals;

determine at least one beam failure based on any of the first set of beam failure detection reference signals and the second set of beam failure detection reference signals;

determine a reference signal from one of the first and second sets of reference signals based on the determined at least one beam failure; and transmit second information indicating the determined reference signal and indicating the one of the first and second sets of beam failure detection reference signals associated with the determined reference signal.

12. The WTRU of claim 11, wherein:
the first information indicates (i) one uplink resource set associated with at least one of the first and second sets of reference signals, or (ii) first and second uplink resource sets associated with the first and second sets of reference signals, respectively; and the second information is transmitted using (i) the one uplink resource set, (ii) the first uplink resource set based on the determined at least one beam failure being a beam failure based on the first set of beam failure detection reference signals, or (iii) the second uplink resource set based on the determined at least one beam failure being a beam failure based on the second set of beam failure detection reference signals.

13. The WTRU of claim 11, wherein the circuitry being configured to determine a reference signal from one of the first and second sets of reference signals comprises the circuitry being configured to:
determine, from one of the first and second sets of reference signals, a reference signal having a best quality; and use the reference signal having the best quality as the determined reference signal.

14. The WTRU of claim 11, wherein the first information indicates a downlink resource set for each of the first and second sets of reference signals, wherein the circuitry is configured to:
select the downlink resource set associated with the determined reference signal; and monitor one or more downlink resources of the downlink resource set for information indicating at least one of (i) any of a confirmation, an acknowledgement and a non-acknowledgement of the at least one beam failure, and (ii) any of a confirmation, an acknowledgement and a non-acknowledgement of receipt of the second information.

15. The WTRU of claim 11, wherein the circuitry being configured to determine the first set of beam failure detection reference signals and the second set of beam failure detection reference signals comprises the circuitry being configured to:
determine the first set of beam failure detection reference signals and the second set of beam failure detection reference signals from among a plurality of reference signals associated with a plurality of control resource set pools, based on first and second identifiers of the first and second control resource set pools of the plurality of control resource set pools.

16. The WTRU of claim 11, wherein the circuitry being configured to transmit the second information comprises the circuitry being configured to transmit any of:
a physical random access channel transmission comprising the second information using one or more physical random access channel resources associated with the determined reference signal; and a physical uplink control channel transmission comprising the second information using one or more physical uplink control channel resources associated with the determined reference signal.

17. The WTRU of claim 11, wherein the second information is transmitted in a medium access control (MAC) control element (CE).

18. The WTRU of claim 11, wherein the second information indicates a cell associated with the one of the first and second sets of beam failure detection reference signals associated with the determined reference signal.

19. The WTRU of claim 11, wherein the circuitry is configured to:
initiate a random access procedure on a condition that beam failure recovery is not successful for both the first and second sets of reference signals.

* * * * *